(12) United States Patent
Iossel et al.

(10) Patent No.: US 6,245,989 B1
(45) Date of Patent: Jun. 12, 2001

(54) LAND ELECTRODE FOR A HIGH VOLTAGE DIRECT CURRENT TRANSMISSION SYSTEM

(75) Inventors: Yuri Iossel, Helsinki; Grigory Kazarov; Veijo Koski, both of Espoo; Alexey Poliakov, Helsinki, all of (FI); Heiko Gebhardt, Keispelt (LU)

(73) Assignee: ARB Power Systems AB, Ludvika (SE)

( * ) Notice: Subject to any disclaimer, the term of this patent is extended or adjusted under 35 U.S.C. 154(b) by 0 days.

(21) Appl. No.: 09/297,200
(22) PCT Filed: Aug. 7, 1997
(86) PCT No.: PCT/SE97/01330
§ 371 Date: Jun. 21, 1999
§ 102(e) Date: Jun. 21, 1999
(87) PCT Pub. No.: WO98/19364
PCT Pub. Date: May 7, 1998

(30) Foreign Application Priority Data

Oct. 28, 1996 (SE) ................................................ 96121904

(51) Int. Cl.$^7$ ........................................................ H01R 4/66
(52) U.S. Cl. ........................ 174/6; 174/68.1; 174/70 R; 174/70 S
(58) Field of Search ................................. 174/6, 7, 68.1, 174/68.3, 70 R, 70 S, 101.5, DIG. 2, 135, 138 R

(56) References Cited

U.S. PATENT DOCUMENTS

| | | | |
|---|---|---|---|
| 4,728,177 | * 3/1988 | Green | 350/357 |
| 5,120,904 | 6/1992 | Ullman et al. | 174/68.1 |
| 5,910,236 | * 6/1999 | Iossel et al. | 204/280 |

FOREIGN PATENT DOCUMENTS

| | | |
|---|---|---|
| 458498 | 8/1968 | (CH) . |
| 295 15 163 U | 11/1995 | (DE) . |
| 1280382 | 11/1961 | (FR) . |
| WO 93/02311 | 2/1993 | (WO) . |
| WO 97/14196 | 4/1997 | (WO) . |
| WO 98/19362 | * 5/1998 | (WO) . |

OTHER PUBLICATIONS

Lin, H. et al., "Earth resistivity measurements and current density calculation for toroidal HVDC ground electrodes", IEEE/CSEEE Joint Conference on High–Voltage Transmission Systems In China, Beijing, China, Oct. 17–22, 1987, pp. 514–518.

Moore, R.J. et al., IEEE, 1996, "Cahorabassa–Apollo HVDC Link", pp. 699–704.

Hannestad, J.W., "Electrode Design", pp. 1–47, EPRI–EL–2020, 1981.

Uhlmann, Erich, "Power Transmission By Direct Current", Springer–Verlag, 1975, pp. 255–273.

* cited by examiner

Primary Examiner—Dean A. Reichard
Assistant Examiner—Charlie Nguyen
(74) Attorney, Agent, or Firm—Connolly, Bove, Lodge & Hutz, LLP

(57) ABSTRACT

A land electrode has at least one feeding element connected to an electrode line of a high voltage direct current (HVDC) transmission system. The land electrode is in electric contact with a conducting medium and further comprises at least two electrically non-conducting element barriers, spaced apart along the feeding element. Between the element barriers, an active part of the surface of the feeding element is formed, which active part is in electric contact with the conducting medium. The element barriers have a substantial extension outwards from the active part of the surface of the feeding element into the first conducting medium, so as to homogeneize the current distribution along the active part of the surface of the feeding element.

18 Claims, 24 Drawing Sheets

LAND ELECTRODE FOR A HIGH VOLTAGE DIRECT CURRENT TRANSMISSION SYSTEM

TECHNICAL FIELD

The invention relates to a land electrode for grounding of a high voltage direct current (HVDC) transmission system.

BACKGROUND OF THE INVENTION

Ground electrodes, in this context, means devices used to connect an electrode line of a power network comprising an HVDC transmission system, via one or more feeder cables, to a conducting medium such as soil or sea water.

HVDC transmission systems usually have DC voltages above 5 kV and a transmitted power above 10 MW.

As compared with alternating current (AC) transmission systems, HVDC transmission systems require only two conductors. At least one of those conductors is implemented as an overhead line or a high voltage cable. For bipolar transmission another conductor of the same kind is used under normal operating conditions, but in monopolar transmission, the ground, that is soil and/or sea water, is used as a return conductor for the transmitted DC-current. However, also in HVDC transmission systems intended for bipolar transmission, ground electrodes are required to transfer unbalance currents and, under operation in monopolar mode, the whole DC current transmitted by the HVDC system.

The ground electrodes can operate as anodes, that is, delivering current to the conducting medium, or as cathodes, that is, receiving current from the medium.

Depending on the location of the HVDC-system, the ground electrodes can be located in soil or in sea water. Ground electrodes located in soil usually have certain advantages as compared to ground electrodes located in sea water. Thus, they are comparatively easy to mount and to have access to in the case of maintenance or repair. At least under normal operating conditions they are also better protected against mechanical damages and will usually not be subject to varying mechanical stresses. The risk that human beings or animals will come into direct contact with the electrode is very small.

This application is concerned with land electrodes, that is, ground electrodes located in soil.

The land electrode, via one or more feeder cables, transfers the DC current from an electrode line of the HVDC system to the soil or vice versa. The soil, in this context, is generally to be regarded as a conducting, however, inhomogeneous medium.

For a general description of ground electrodes in connection with HVDC systems, reference is made, for example, to E. Uhlmann: Power Transmission by Direct Current, Springer Verlag 1975, in particular pages 255–273.

The land electrodes are-apart from the requirements as to current and resistance-also required to be electrically safe, to have high operational reliability and sufficiently long service life, and in addition, to not cause any harmful environmental effects, such as for instance drying up of the soil in the vicinity of the electrode.

The resistance of ground electrodes has to be low, usually well below one ohm. In particular for land electrodes, the step voltage at the surface of the soil in the vicinity of the electrode, which creates a danger to human beings, should be less than a specified level. The step voltage Vs is calculated according to an expression $V_s=(5+0.03*\rho_s)$ volts, where $\rho_s$ is the minimal local specific resistivity (expressed in ohm*m), of the soil located above the electrode.

A conventional land electrode comprises an active part, herein called the electrode body, which is in electric contact with the soil and through which the current is transferred, interconnection cables for internal connection of parts of the electrode body as described below, and additional parts performing mechanical functions, including mechanical protection.

The average current density on the surface of the electrode body is usually not higher than a few $A/m^2$.

In order to reach a sufficiently low grounding resistance, a land electrode usually comprises a large number of sub-electrodes, each sub-electrode being fed from a separate sub-electrode feeder cable. A sub-electrode comprises a backfill, usually a bed of coke, and an active sub-electrode element, the feeding element, embedded in the backfill. The feeding element is in electric contact with the sub-electrode feeder cable and has an active part of its surface which is in electric contact with the backfill. In cases where the sub-electrode comprises more than one such feeding element, these elements are coupled to each other by feeding element interconnection cables.

The backfill occupies a certain volume around the feeding element and is in its turn embedded in the soil. The active part of the surface of the backfill is that part of its surface which is in electric contact with the soil.

The sub-electrodes are usually arranged in sections, each section being fed from a separate section feeder cable, which is in electric contact with the electrode line. Each section of sub-electrodes may comprise a plurality of sub-sections, each sub-section being fed from a separate section interconnection cable which is in electric contact with the section feeder cable.

The sub-electrodes are arranged along contour lines. A contour line is to be understood as the trace, as seen from above, of a section or a sub-section of sub-electrodes. The contour line of a section or a sub-section of sub-electrodes can typically have the shape of a circular arc, in which case the sections and/or sub-sections of sub-electrodes can be arranged in such a way that the contour lines of the electrode coincide with a circle.

FIG. 1 illustrates schematically an electrical configuration typical for an HVDC transmission system with land electrodes at both ends. An electric alternating current (AC) power network N1 is via a transformer T1 coupled to the AC-side of a thyristor converter SR1 and an AC power network N2 is via a transformer T2 coupled to the AC-side of a thyristor converter SR2. On the DC-sides of the converters, an overhead line LO connects one of their respective poles, and the ground return comprises two electrode lines LE1, LE2, two land electrodes 15 of similar structure, and the soil (not shown) between the electrodes. The land electrode at the converter SR1 comprises a plurality of sub-electrodes 16, each of which is coupled to the electrode line via a feeder cable 29. Each subelectrode comprises a plurality of feeding elements 161,162,163, interconnected by interconnection cables 2', 2", 2'" respectively. The electrode body comprises all the feeding elements 161,162,163 comprised in all the sub-electrodes coupled to the electrode line.

FIG. 2A shows schematically a typical layout, as seen from above, of a land electrode 15 for an HVDC transmission system. The contour line of the electrode is in the form of a circle and the electrode is fed from an electrode line LE1 via three section feeder cables 29a, 29b, 29c. FIG. 2B shows a side view of a part of the electrode, comprising three series connected rod-shaped feeding elements 161,162, 163, with their longitudinal direction in a horizontal direction. Each feeding element is embedded in a layer 170 of backfill in the form of coke, which layer in turn is embedded in a soil layer 28 at some distance below the surface 10 of the soil. All parts of the electrode are similar to the part illustrated in FIG. 2A. FIG. 2C shows a cross section through the electrode along the section IIC—IIC in FIG. 2B. The diameter of the ring can typically be in the order of 1 km. The material of the feeding elements is typically silicon iron or graphite (for electrodes operating as cathodes, also mild steel).

Alternatively, the feeding elements may be arranged with their longitudinal direction in a vertical direction. This is illustrated in FIG. 3A, showing a side view of a part of an electrode of similar ring form as the electrode illustrated in FIG. 2A, with three parallel connected rod-shaped feeding elements 161,162, 163. FIG. 3B shows a cross section through a sub-electrode along the section IIIB—IIIB in FIG. 3A. Each feeding element is embedded in a layer of backfill, arranged as described in connection with FIGS. 2B and 2C.

Typically, the feeding elements are manufactured in the form of rods, which makes them easy to manufacture and to mount. FIGS. 4A–4B illustrate prior art feeding elements, which are designed with an attempt to prolong their service lifetime. FIG. 4A shows a rod-shaped feeding element 161 with two ends 101 and 102 and with a feeder cable 2 coupled to the end 101. At the feeding end 101, the feeding element has an increased diameter and is in addition protected by a sleeve 3, made of a non-conducting material. The active part S of the surface of the feeding element is in this case its total surface less that part of the total surface which is covered by the sleeve. FIG. 4B shows a sub-electrode element similar to the one as shown in FIG. 4A, the only difference being that it is provided with two feeder cables 2a, 2b, one at each end 101,102 respective of the feeding element, and with one sleeve at each end.

Usually, in conventional land electrodes, feeding elements and sub-electrodes of the same kind are used for the totality of the electrode body.

The following disadvantages with known land electrodes have been observed.

Land electrodes for HVDC transmission systems, which transfer comparatively high currents, often cover large areas.

When operating as anodes, the feeding elements tend to dissolve themselves, in particular at their ends, and the connection to the sub-electrode feeder cable, or, as the case may be, to the feeding element interconnection cable, may finally be broken by dissolution of the part of the feeding element comprising the connection.

The coke backfill is deteriorated during the operation of the electrode, so called coke consumption, leading to an increased ground resistance and a decreased lifetime.

Electrodes located in soil will, when operating as anodes, usually cause a decrease of the soil humidity in the vicinity of the surface of the electrode body. Therefore, the current density at the surface of the electrode body is usually restricted to values typically in the range from 0.5 A/m$^2$ to 1.5 A/m$^2$, depending on the type of soil, where the lower value is valid for soil layers such as clay. Higher current densities may result in electro-osmotic processes in the soil and, as a consequence, a further decrease of the soil humidity and a corresponding increase of the specific electric resistivity of the soil and possibly irreversible changes of the soil properties in the vicinity of the surface of the electrode body. Another consequence is that the current density on neighboring parts of the electrode body will increase, resulting in that the above mentioned phenomenon can develop along the electrode.

With an extension of the electrode over large areas follows an increased possibility that different parts of the electrode will be located in soil layers with different physical properties. Soil layers, in this context, are to be understood as volumes of soil in which the sub-electrode are embedded. As a consequence, in the vicinity of a soil layer with high conductivity, there is a risk for violation of electric safety regulations. Further, local heating of the soil layer may become high, causing a dry up of the soil, especially in combination with electro-osmotic processes.

To prolong the service lifetime of the feeding elements, various remedies have been proposed, as described above in connection with FIGS. 4A–4B. Thus, it has been proposed to increase the diameter of the feeding element near the feeder cable connection. It has also been proposed to provide the end of the feeding element with a sleeve of a non-conducting material. This measure, however, only moves the zone of dissolution to the edge of the sleeve. It has also been proposed to use two feeder connections, one at each end of the feeding element. These measures have, however, only a limited effect on the service life of the feeding element, achieved at the expense of more complicated and expensive designs.

SUMMARY OF THE INVENTION

The object of the invention is to provide a land electrode of the kind stated in the introduction which is improved with respect to the above-mentioned disadvantages connected with the prior art, in particular with respect to the rate of dissolution of the feeding elements, to the lifetime and the reliability of the electrode, and with respect to its size.

A land electrode according to the invention, having at least one feeding element, is characterized in that it further comprises at least two electrically non-conducting element barriers, spaced apart along the feeding element, and between which is formed an active part of the surface of the feeding element, which active part is in electric contact with a first conducting medium, such as coke or soil. The element barriers have a substantial extension outwards from the active part of the surface of the feeding element into the medium. The element barriers act as barriers to the current lines at the feeding element. The current lines will, in the vicinity of the surfaces of the element barriers, be directed along these surfaces, and the element barriers will thereby homogenize the current distribution along the active part of the surface of the feeding element.

A current line, as mentioned above, is to be understood as a line such that, at every point of it, the current density vector at that point is tangential to the line.

Advantageous developments and improvements of the invention will become clear from the following description and claims.

DESCRIPTION OF PREFERRED EMBODIMENTS

Figure 1:
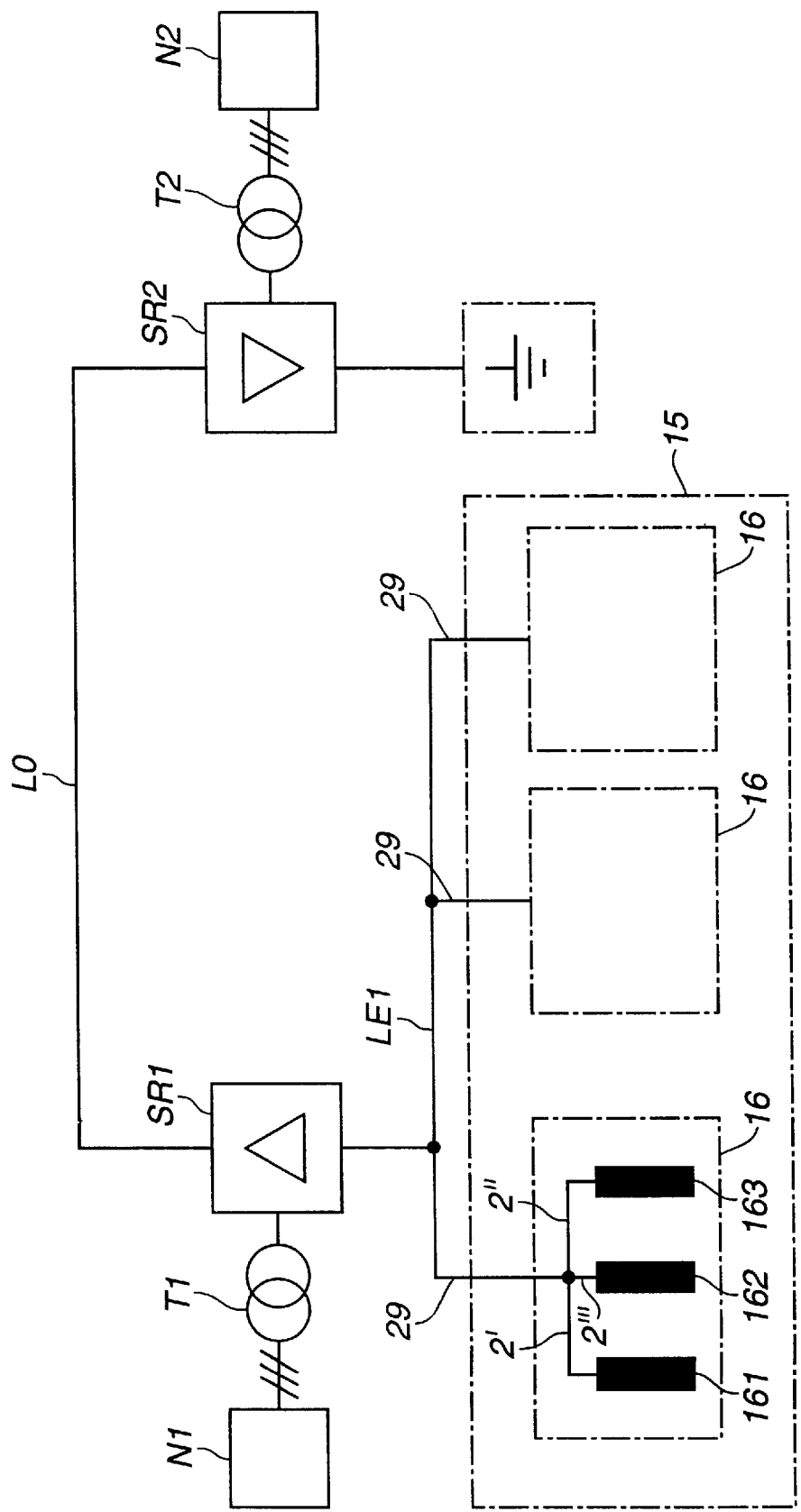
FIG. 1 shows schematically a typical electrical configuration for an HVDC transmission system.
Figure 2A:
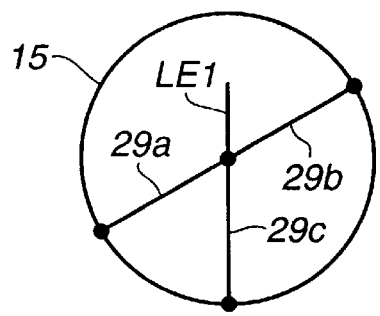
FIG. 2A shows schematically a typical layout of a prior art land electrode for a HVDC transmission system, as seen from above.
Figure 2B:
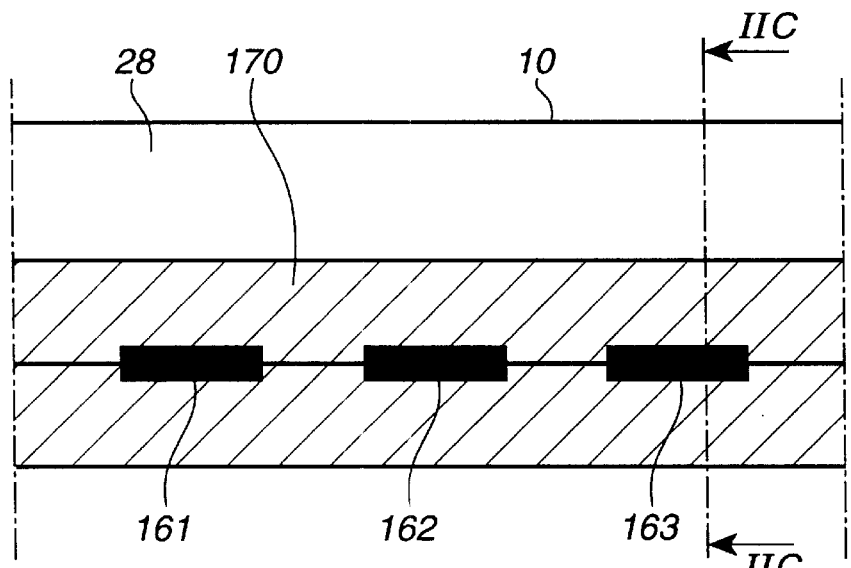
FIG. 2B shows a side view of a part of the electrode according to FIG. 2A.
Figure 2C:
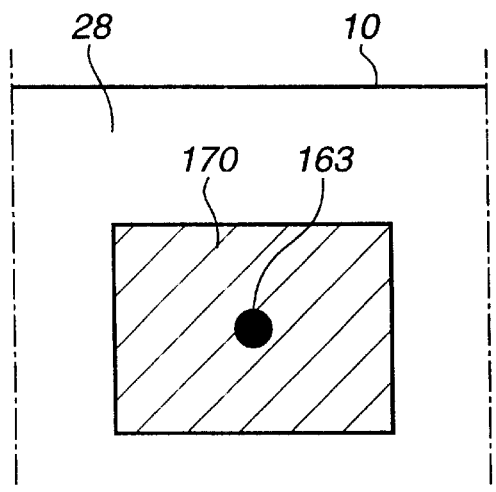
FIG. 2C shows across section through the part of the electrode according shows FIG. 2B.
Figure 3A:
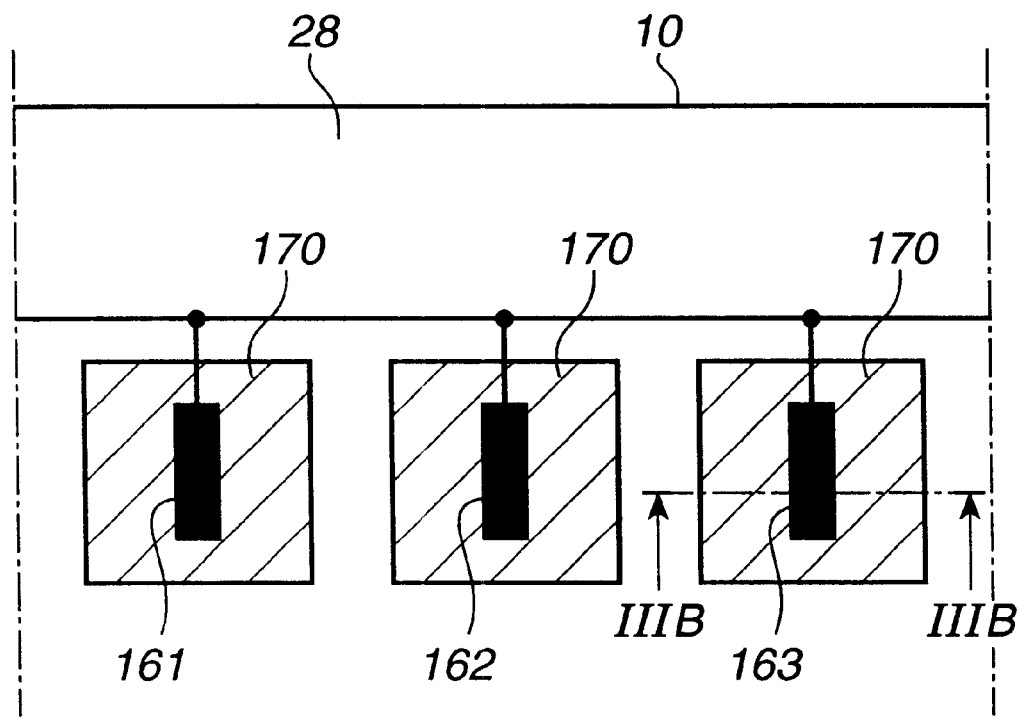
FIG. 3A shows schematically a side view of a part of another embodiment of prior art land electrode.
Figure 3B:
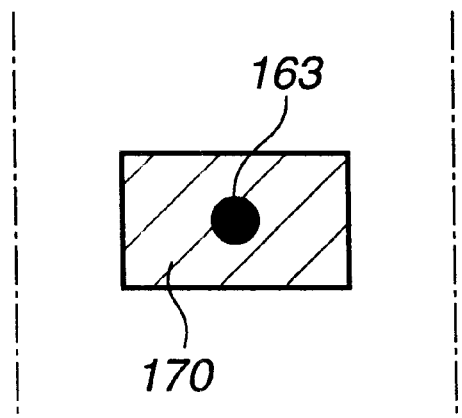
FIG. 3B shows a cross section through a sub-electrode of the electrode according to FIG. 3A.

A land electrode according to the invention and to developments of the invention, as described below, is designed with respect to service lifetime and reliability, while taking the site conditions, including soil properties, into consideration.

The design procedure comprises the following steps with respect to the feeding elements, to the sub-electrodes, to the sections and the sub-sections of subelectrodes and to the contour lines of the electrode. The characterizing features of the invention and of the developments of the invention making such steps possible, will, in the following, be described in the same order as the steps are mentioned.

In order to arrive at an electrode with a long service lifetime and a high reliability, the first step has to be to design the sub-electrodes with respect to these objects.

In homogeneous soil, a contour line of the electrode which coincides with a circle, and along which contour line the sub-electrodes are distributed with equal intermediate distances, results in a homogeneous current distribution along the contour line, that is, the current transferred to the soil per length unit of the circumference of the contour line of the electrode, is constant along the mentioned circumference.

Therefore, the next step is usually to try to decrease the size of the electrode so that the soil can be assumed to be homogeneous in the vicinity of circular contour lines.

Where no such size and location of the electrode is possible to find, that is, that the electrode has to be located in inhomogeneous soil, the following steps may be taken, preferably in the mentioned order.

To arrange the sub-electrodes in sections and/or sub-sections with contour lines in the shape of circular arcs, and with unequal intermediate distances between the sub-electrodes, with vertically oriented sub-electrodes or with combinations of vertically and horizontally oriented sub-electrodes.

To arrange the sections and/or sub-sections of sub-electrodes with contour lines of non-circular shapes.

To control the current distribution between the sections and/or the sub-sections of sub-electrodes.

To design the electrode with contour lines which do not form closed curves, for instance as one or more circular arcs, interspersed with areas not comprising an) sub-electrodes.

Design of the Sub-electrode with Respect to Service Lifetime and Reliability It has been observed that the current distribution on the surfaces of the backfill and the feeding element is usually significantly inhomogeneous, that is, that the maximum value of the current density can significantly exceed its average value over these surfaces, and that this inhomogeneous current distribution is a major reason for the above mentioned disadvantages with prior art land electrodes.

The actual current density distribution on the electrode body depends on the current distribution between the sub-electrodes (and as the case may be, sections and sub-sections of sub-electrodes), as well as on the current distribution within each sub-electrode.

The current distribution within the sub-electrodes is normally determined only by their design, as, due to their size, the soil layer in the vicinity of each separate sub-electrode may, for practical purposes, be considered as homogenous.

Figure 5A:
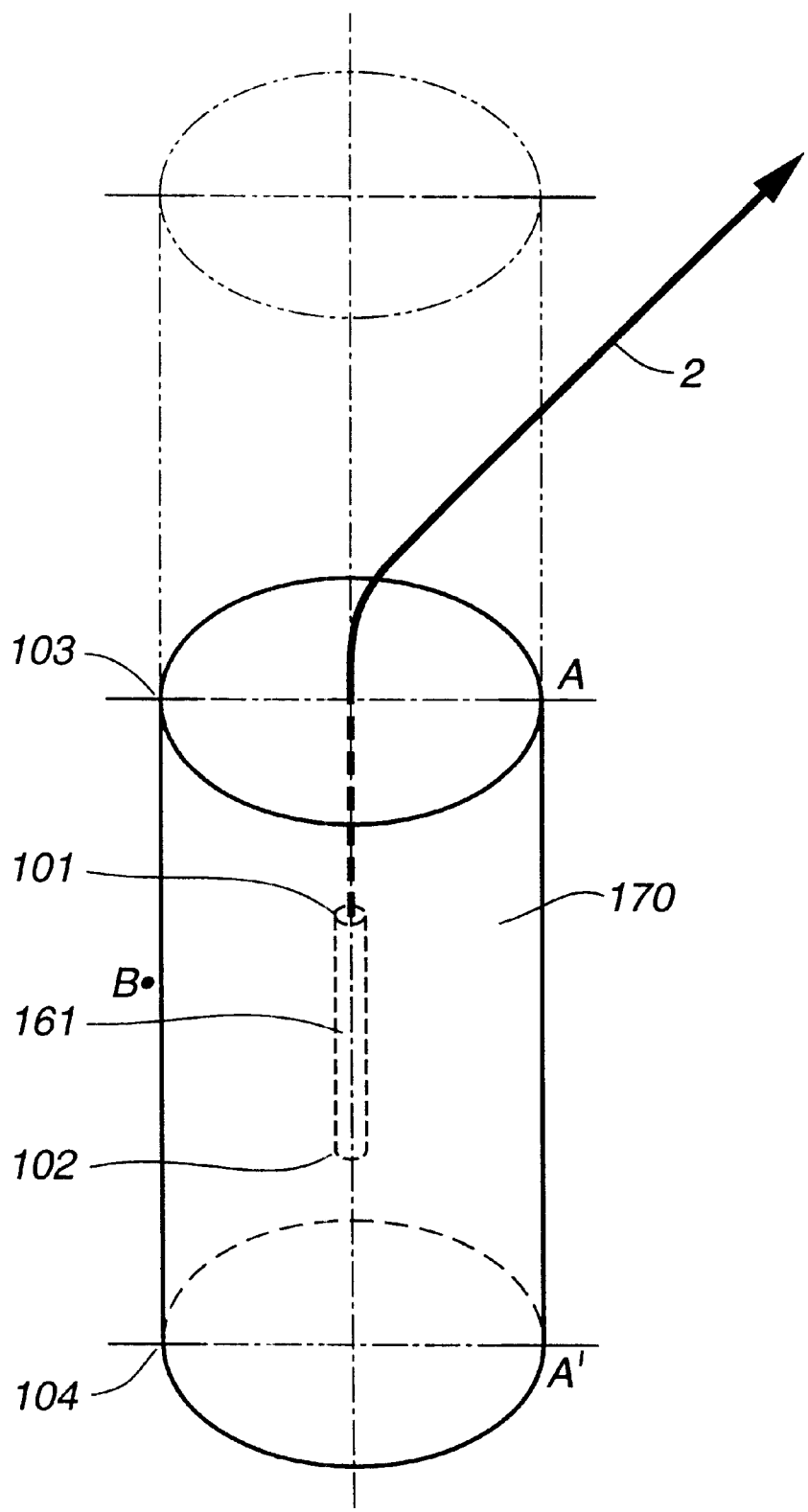
FIG. 5 shows a typical prior art design of a sub-electrode for use in land electrodes.

FIG. 5 shows schematically a typical design of a conventional sub-electrode for use in land electrodes, A cylindrical feeding element 161 is embedded in a backfill 170, usually coke with specified properties, also of cylindrical shape. The feeding element is fed from a feeder cable 2.

The sub-electrode can be arranged in the soil with a horizontal or with a vertical orientation. As illustrated in FIGS. 2B–2C and 3A–3B, the backfill may also have a rectangular cross section.

The specific electric conductivity of the soil is usually significantly below the specific conductivity of the material of the feeding element and of the backfill For conventionally designed land electrodes, it is usually assumed that the current distribution on the surface of the feeding element 161 and on the outer surface of the backfill 170 is uniform, that is, that the current density $j_1$ on the surface of the feeding element is calculated as $j_1=I_{SE}/SE$ and the current density $J_2$ on the outer surface of the backfill is calculated as $j_2=I_{SE}/SS$, where $I_{SE}$ is the current transferred by the sub-electrode, and SE and SS are the areas of the active parts of the surface of the feeding element and of the surface of the backfill, respectively. However, it has been found that in fact both these current densities vary significantly along their respective surfaces. As an example, for a backfill with a diameter of 1.2 m and a longitudinal extension of 3.5 m, located in soil with a specific resistivity of 10 $\Omega*m$, the maximum current density, which appears at the circumferences of the backfill at its both ends, in the Figure indicated with A and A', is about three times higher than the minimum current density, which appears at the circumference of the backfill at its mid point, in the Figure indicated with B.

Figure 6A:
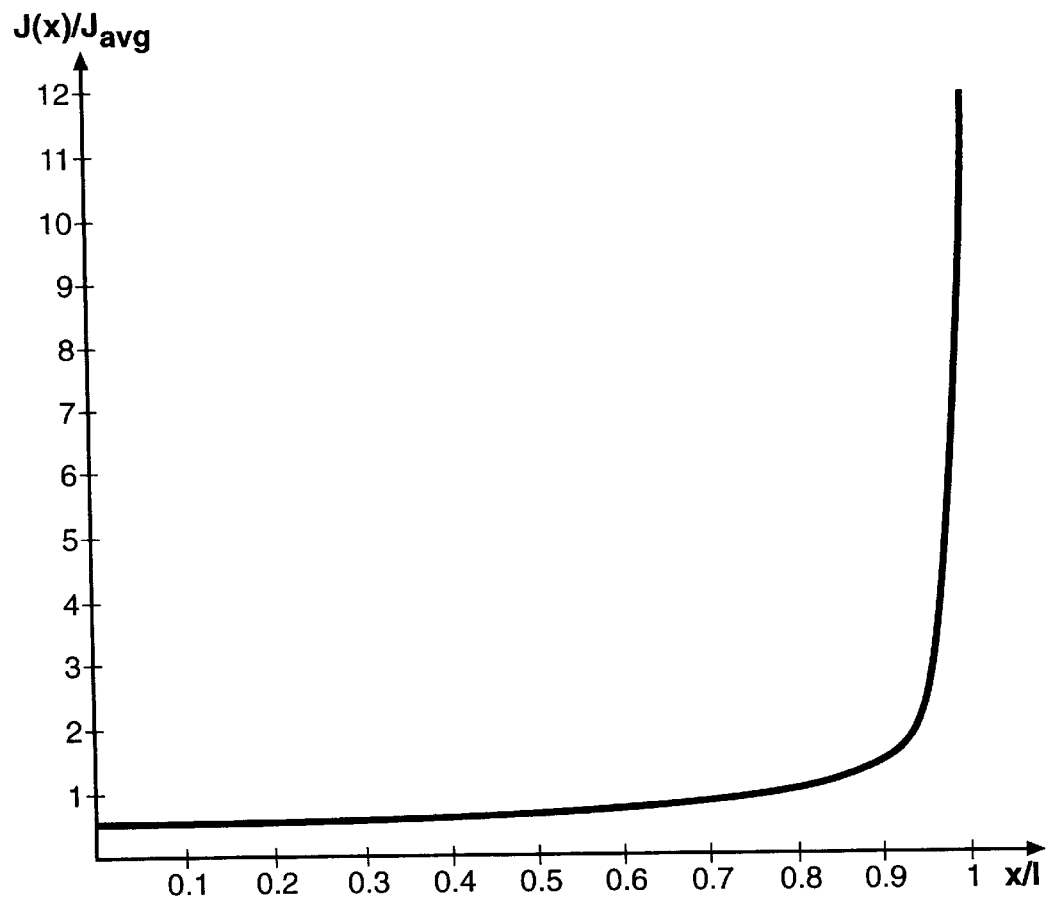
FIG. 6A shows the current distribution along a feeding element according to FIG. 5, in anodic operation.

FIG. 6A shows on the vertical axis the calculated normalized local current density J/Javg at the surface of a feeding element 161, of the kind as described in connection with FIG. 5, for a land electrode operating as an anode. The length of the feeding element is 2L and J is the actual current density at a relative distance X/L along the feeding element from the mid of it, and Javg is the average value of the current density along the electrode. The horizontal axis shows the relative distance X/L with positive direction to the right in the Figure. In the specific example, it is assumed that the cylinder is 1 m long and has a diameter of 3 cm and that it is embedded in soil with an electric specific resistivity of 50 ohm*m.

Figure 6B:
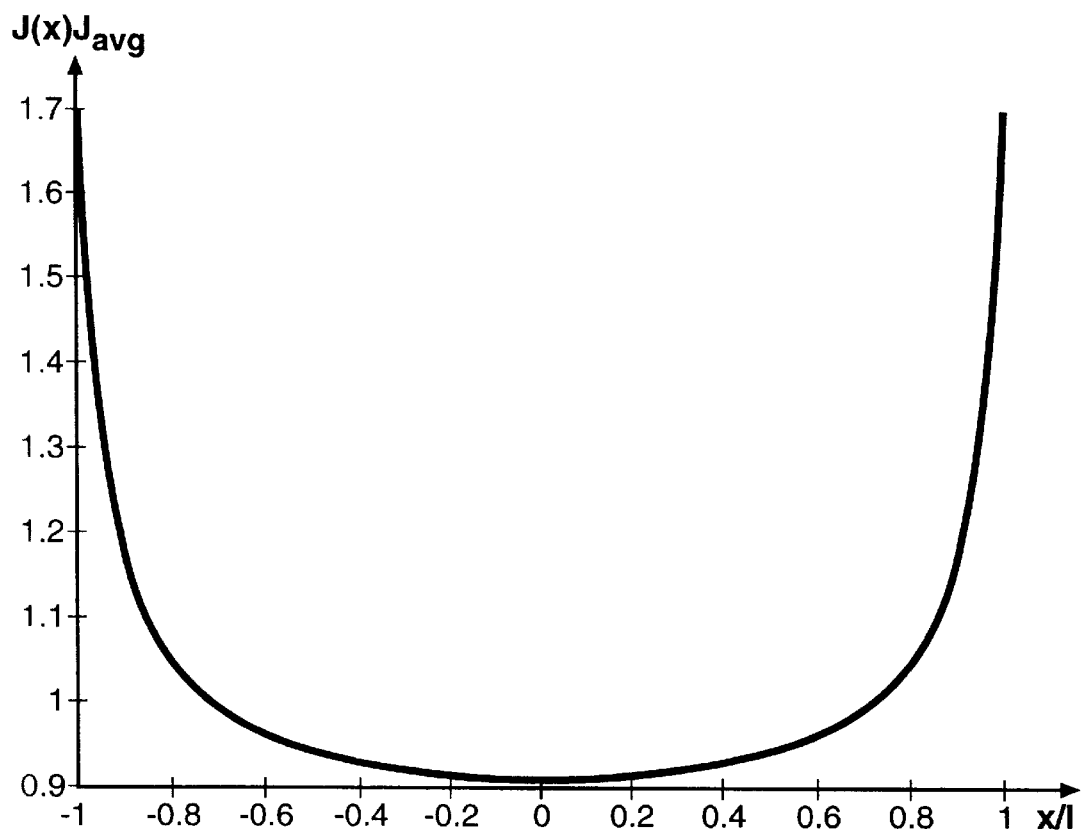
FIG. 6B shows the current distribution along a feeding element according to FIG. 5, in cathodic operation.

FIG. 6B shows the same entities as in FIG. 6A, for positive and negative values of X/L, but calculated for a land electrode operating as a cathode. The calculations are based on a specific cathodic polarization resistivity $b_c=0.2 \Omega*m^2$, representative for a feeding element made of silicon iron, embedded in soil.

The FIGS. 6A–6B show that the normalized current density increases rapidly in the neighborhood of the ends of the feeding element, in particular for land electrodes operating as anodes.

The rate of dissolution of materials used in backfill and in feeding elements is in general increasing with increasing current density. Also, the rate of electro-osmotic processes and drying out of soil in the vicinity of the sub-electrode increases with increasing current density. Therefore, various deterioration processes will take place within the sub-electrode as well as in its vicinity.

Deterioration Processes at Electrodes Operating as Anodes

For electrodes operating as anodes, the following phenomena can be observed; coke consumption at the edges of the backfill, dissolution of the feeding element at its ends, and electro-osmotic processes in the soil in the vicinity of the edges of the backfill.

In case an electrode usually operating as an anode, due to changes in the operation of the HVDC transmission system, will be operating as a cathode, so called reversed operation, probably its feeding element will have lost some material at its ends, which material has been replaced with coke and ground water. In such a case, coke consumption will start immediately at the ends of the feeding element.

Figure 7A:
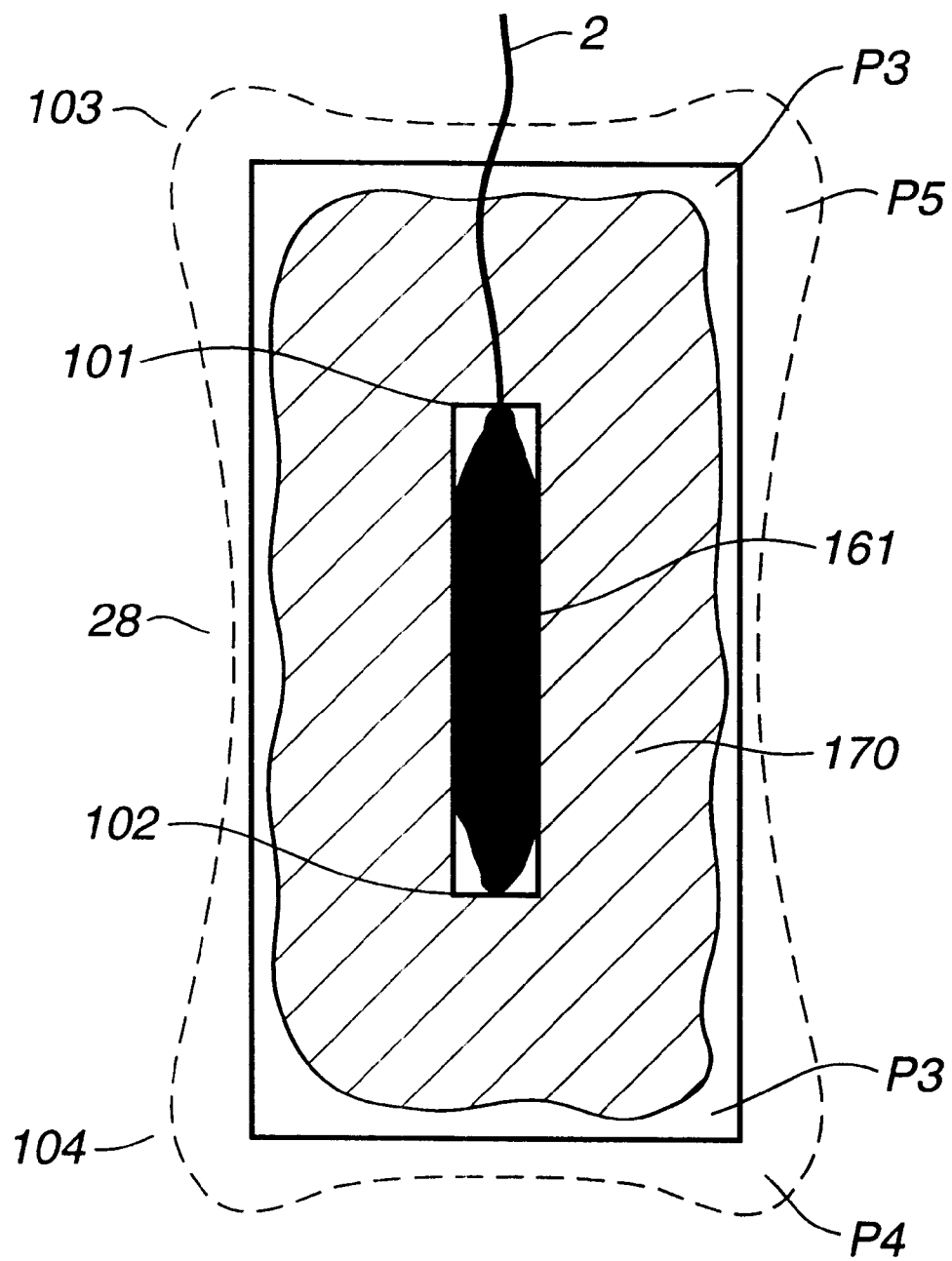
FIG. 7A illustrates anodic dissolution of coke backfill and feeding element dissolution for a sub-electrode according to FIG. 5, in anodic operation.

FIG. 7A illustrates the above mentioned deterioration phenomena for a prior art sub-electrode, similar to the sub-electrode as described in connection with FIG. 5, operating as an anode. The ends of the feeding element 161 are indicated with reference number 101 and 102, and the ends of the backfill with 103 and 104. The backfill is embedded in a soil layer 28. As the rate of dissolution is in general increasing with increasing current density, the material of the feeding element will, due to high current densities at its ends 101,102, start to dissolve at its ends, as indicated in the Figure. This may finally lead to the feeder cable 2 losing its electric contact with the feeding element.

The coke dissolution takes place at the border between the backfill and the surrounding soil layer 28. Pockets P3 of dissolved coke will start to grow at the circumferences of the backfill from both its ends towards the middle of it. For feeding elements of silicon iron, embedded in a backfill of coke, the consumption rate of coke is typically 0.1 kg/A*year.

FIG. 7A also shows zones P4, P5 of soil drying up, due to high current density in these zones, as a result of electro-osmotic processes.

Also, the risk for soil overdrying is highest in zones with high current densities, as a result of the above mentioned electro-osmotic process. The electrodes will, under their operation, usually cause a decrease of the soil humidity in the vicinity of the surface of the electrode body. Thus, allowable current density on the surface of the electrode body is restricted to values typically in the range from 0.5 A/m2 to 1.5 A/m2, depending on the type of soil, where the lower value is valid for soil such as clay layers. Higher current densities may result in electro-osmotic processes in the soil and, as a consequence, a significant decrease of the soil humidity and a corresponding significant increase of the specific resistivity of the soil. This process will cause a further increase of the soil temperature and possibly irreversible changes of the soil properties in the vicinity of the surface of the electrode body. The result will then be that a thin non-conducting film is formed on the surface of that part of the electrode body which is located in soil being the subject to such processes, isolating that part of the electrode-surface from the soil. The current density on the adjacent parts of that surface will consequently increase and the process may lead to a run-away increase of the local current density on the surface of the electrode body.

Deterioration Processes at Electrodes Operating as Cathodes

For electrodes operating as a cathode, the following phenomena can be observed; coke consumption at the ends of the feeding element and possible incorporation of alien hydrogen ions into the electrode material.

In case an electrode usually operating as a cathode, due to changes in the operation of the HVDC transmission system, is operating as an anode, the phenomena mentioned above for usual anodic operation will be observed.

In this context, it is noted that during anodic operation of a feeding element of, for example, silicon iron, a protective film will develop on the surface of the feeding element, reducing the rate of dissolution of the feeding element. Such a film will be destroyed during cathodic operation. Hence, for an electrode usually operating as anode and temporarily changing its operating mode to cathodic operation, the feeding element, after the return to anodic operation, will initially be subject to a higher rate of dissolution than during sustained anodic operation. This higher rate of dissolution will prevail until the film is reestablished, which might typically take a time on the order of a month.

Figure 7B:
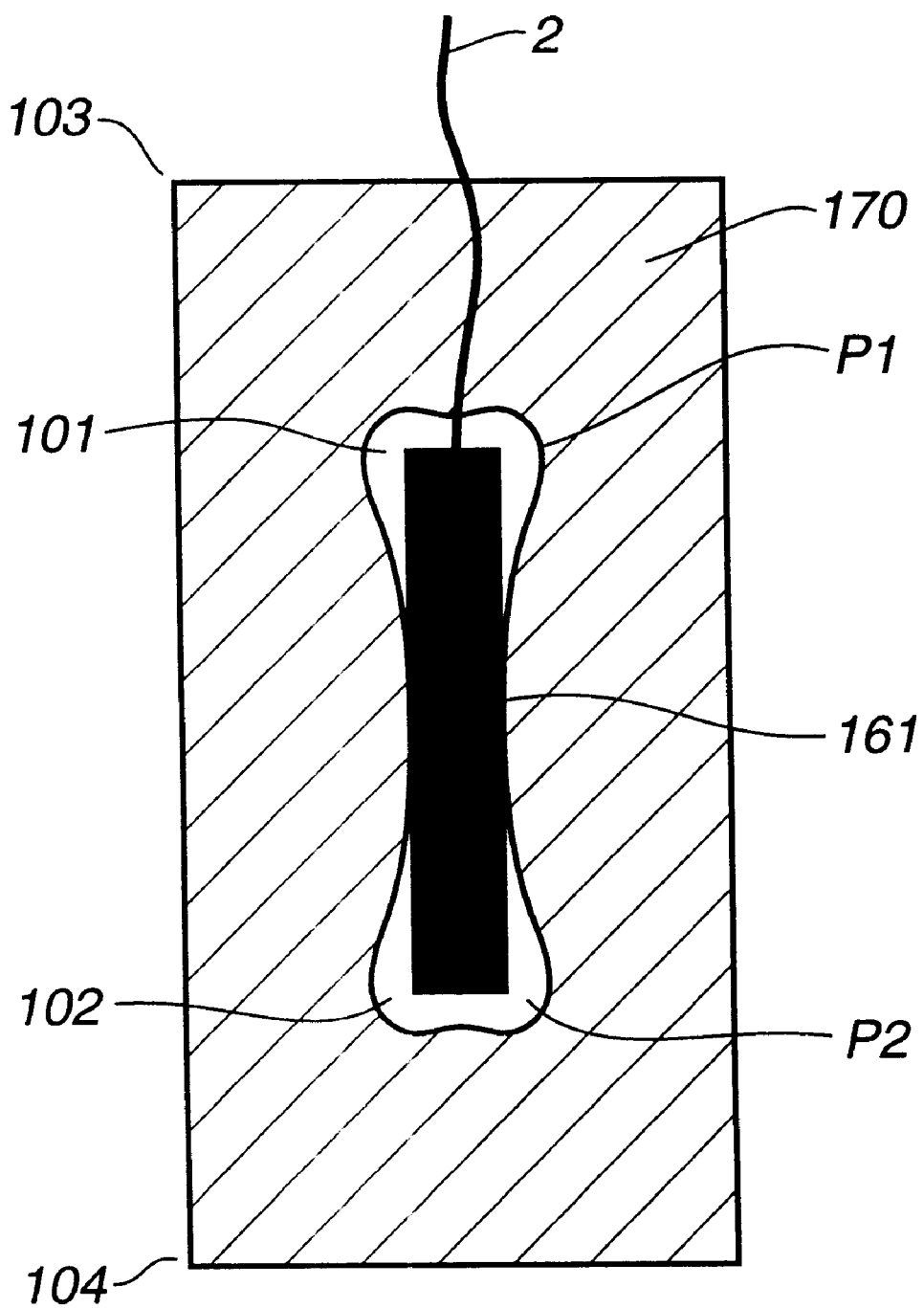
FIG. 7B illustrates anodic dissolution of coke backfill for a sub electrode according to FIG. 5, in cathodic operation.

FIG. 7B illustrates the above mentioned deterioration phenomena for a prior art sub-electrode, similar to the sub-electrode as described in connection with FIG. 5, operating as a cathode. The ends of the feeding element 161 are indicated with reference number 101 and 102. Pockets P1, P2 of anodically dissolved coke are formed in the vicinity of the surface of the feeding element, starting at its ends. These pockets, during the operation of the electrode, will grow along the surface of the feeding element.

This accelerated coke dissolution near the ends of the feeding element, when the land electrode operates as cathode, is explained as follows. During the initial period of operation, coke grains in direct contact with each other provide an electronically conducting path for the current. However, as the contact areas between the coke grains are small, the current density in the contact zone will be high, leading to a significant temperature increase at the contact surfaces. As a result, the coke starts to burn in the grain contact points, and due to inflow of ground water and of ash, the space between the grains is filled with an electrolyte having ionic conductivity. The transition to an ionically conducting medium will further increase the rate of coke consumption.

Electrodes operating as cathodes can also be deteriorated by incorporation of alien hydrogen ions into the material of the feeding element, thereby negatively affecting its mechanical integrity. Also, the speed of such a process increases with increasing current density.

Thus, the coke as well as the material of the feeding elements dissolves significantly faster in zones with high current densities, that is, near the circumferences of the backfill at its both ends edges and in the neighborhood of the ends of the feeding element, respectively, than in zones with lower current densities, that is, in zones located at the mid of the feeding element and the backfill respectively.

Characterizing Features of the Invention with Respect to the Feeding Element

A land electrode according to the invention, having at least one feeding element, is characterized in that it further comprises at least two electrically non-conducting element barriers, spaced apart along the feeding element, and between which is formed an active part of the surface of the feeding element, which active part is in electric contact with a first conducting medium, such as coke or soil. The element barriers have a substantial extension outwards from the active part of the surface of the feeding element into the medium. As will be further explained below, the element barriers act as barriers to the current lines at the feeding element. The current lines will, in the vicinity of the surfaces of the element barriers, be directed along these surfaces, and the element barriers will thereby homogenize the current distribution along the active part of the surface of the feeding element. A current line, as mentioned above, is to be understood as a line such that, at every point of it, the current density vector at that point is tangential to the line.

Figure 8A:
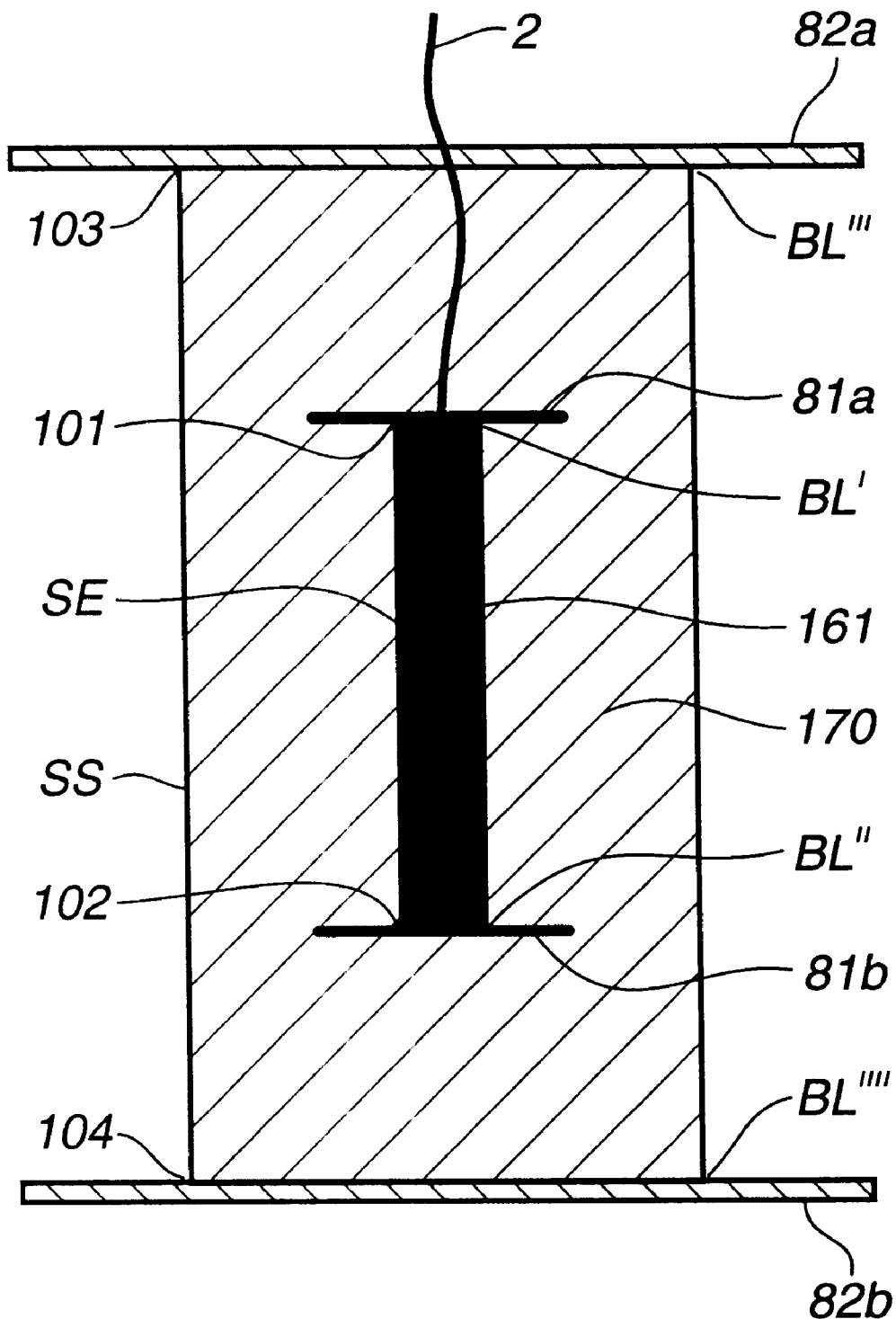
FIG. 8A shows schematically a side view of a sub-electrode according to the invention.

FIG. 8A shows schematically a side view of a sub-electrode as described in connection with FIG. 5. In the embodiment of the invention as illustrated in FIG. 8A, the sub-electrode comprises, in contrast to the sub-electrode as described in connection with FIG. 5, two electrically non-conducting element barriers 81a, 81b, located with one barrier at each end 101, 102 respectively, of the feeding element. The element barriers are made of a non-conducting material, chosen such that they maintain their non-conducting properties during the service lifetime of the electrode, for instance certain qualities of rubber or of plastics like polyethylene or polypropylene. In the embodiment illustrated in FIG. 8A, they have the shape of circular discs, projecting from the envelope surface of the feeding element in a direction in such a way that their planes are substantially perpendicular to the longitudinal direction of the element. The active part SE of the surface of the feeding element is in this case delimited by border lines BL', BL" along which the envelope surface of the feeding element adjoins the respective element barriers.

Figure 8B:
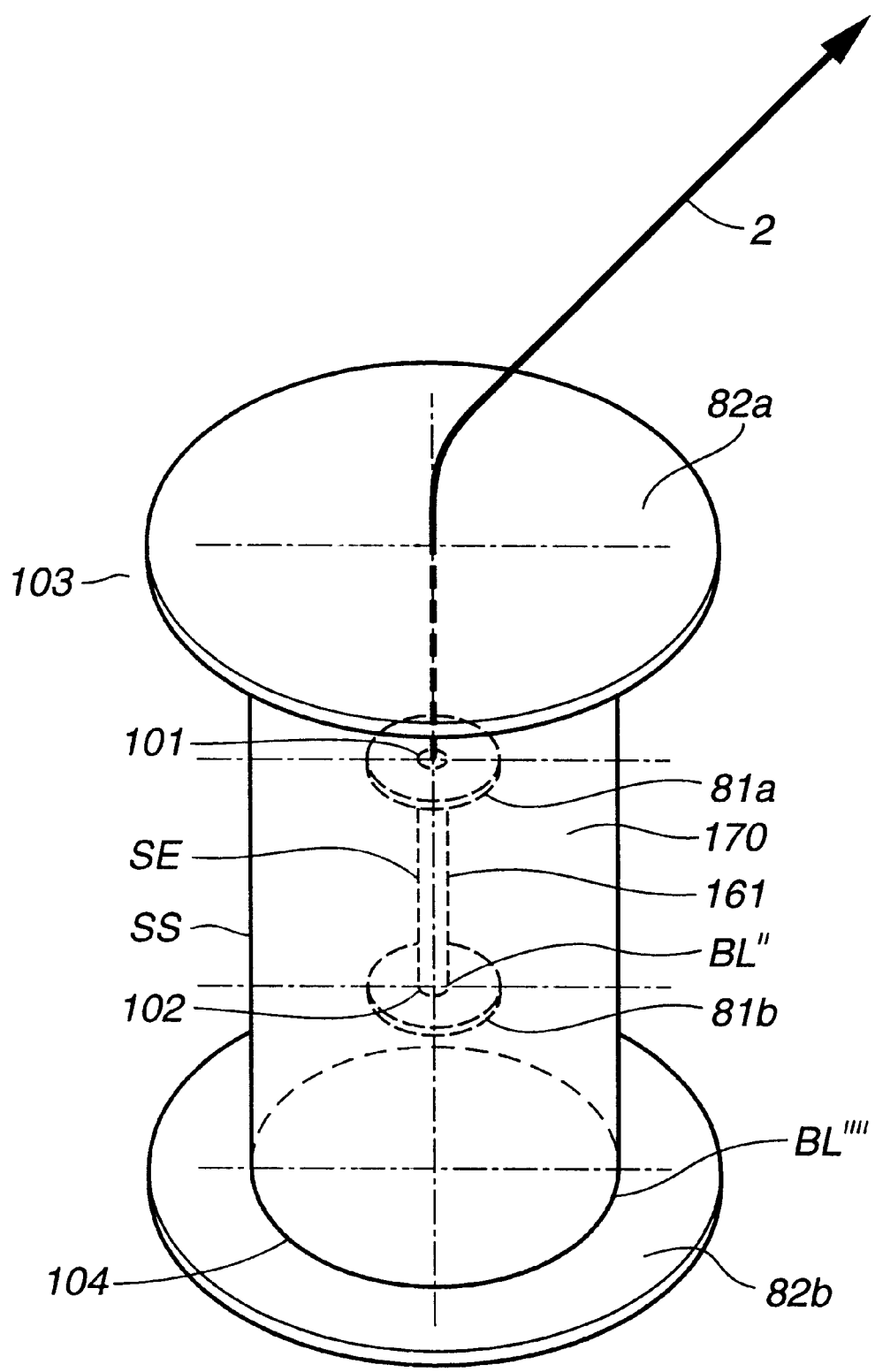
FIG. 8B shows a schematic perspective view of the sub-electrode according to FIG. 8A.

FIG. 8B shows a schematic perspective view of the sub-electrode according to FIG. 8A.

As described above in connection with FIGS. 6A and 6B, the normalized current density along a cylindrical feeding element increases rapidly in the neighborhood of the ends of the feeding element, in particular for land electrodes operating as anodes.

Figure 9:
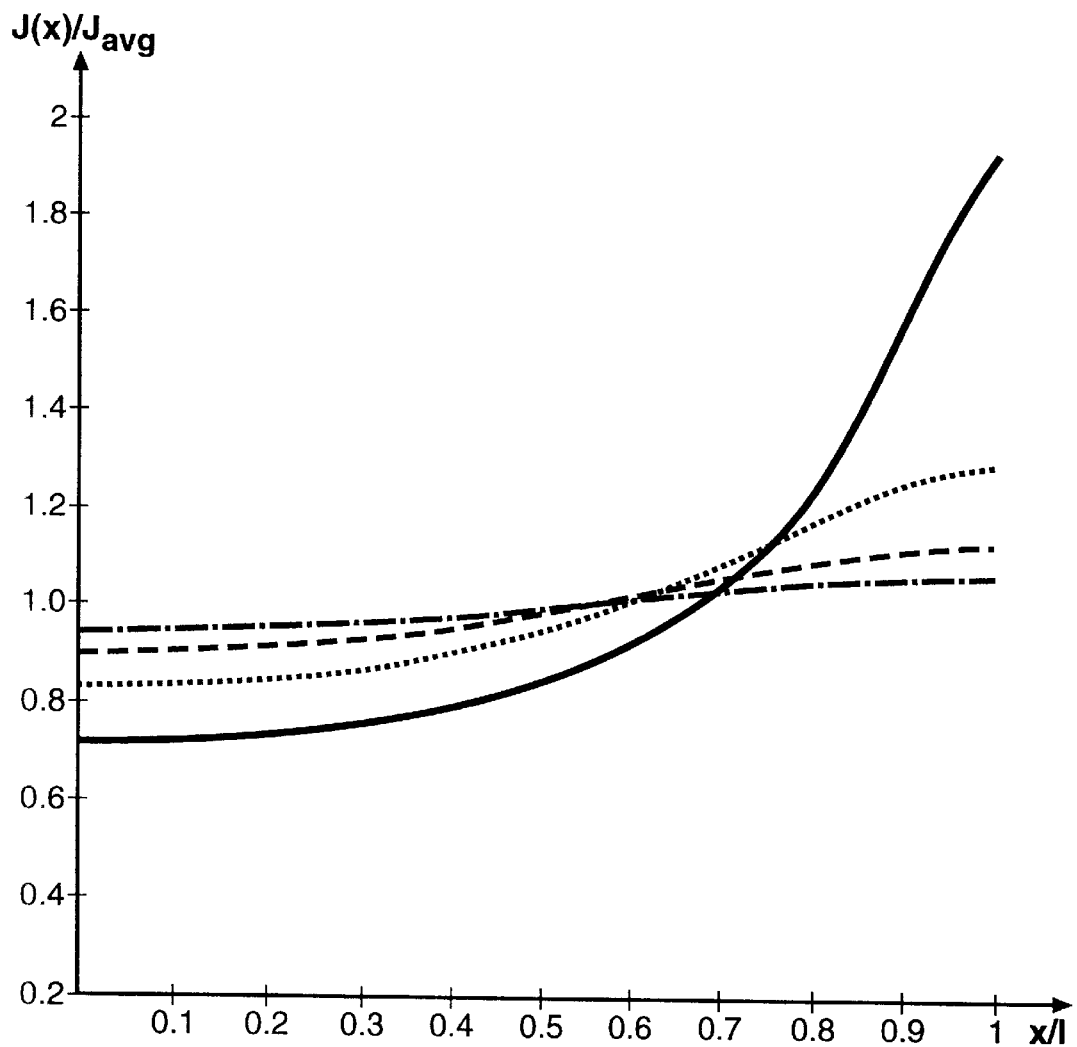
FIG. 9 illustrates the effect of non-conducting element barriers according to FIGS. 8A–8B on the current distribution along a cylinder-shaped feeding element.

Assuming that the feeding element is equipped with two non-conducting element barriers according to the invention, as described in connection with FIGS. 8A–8B, the homogenizing effect of these barriers is illustrated in FIG. 9.

FIG. 9 shows on the horizontal axis the relative distance X/L, the longitudinal length of the feeding element assumed to be equal to 2L, with positive direction to the right in the figure, and on the vertical axis the ratio $J(x)/J_{avg}$, where $J(x)$ is the actual current density at a relative distance X/L along the feeding element according to FIGS. 8A and 8B, from the middle of it, and $J_{avg}$ is the average value of the current density along the feeding element. It is assumed that the radius of the barriers is such that their circumferences extend with a distance h outwards from the envelope surface of the feeding element and that the feeding element is embedded in soil with an electric resistivity of 50 ohm *m. The assumption that the feeding element is embedded in soil is always a worse situation than when, as is usually the case, the feeding element is embedded in coke. However, the situation that a part of the feeding element can be in contact with soil may be the result of the coke consumption processes described above in connection with FIG. 7A.

The diagram shows the homogenizing effect of element barriers with a ratio h/L=0.1 (the whole line), with a ratio h/L=0.3 (the dotted line), with a ratio h/L 0.5 (the dashed line), and with a ratio h/L=0.7 (the point-dashed line).

As can be seen in the Figure, already for a ratio h/1=0.5, the maximum current density, at any point at the surface of the feeding element, will be only about 12–14% higher than the average current density, which for most practical purposes is a sufficient value.

The effect of the barriers on the current distribution along the active part of the surface of the feeding element is thus to homogenize the current distribution.

As is understood from the above, the homogenizing effect on current distribution achieved with these element barriers, will reduce the above mentioned negative effects associated with high local current densities on the feeding element, such as increased dissolution of coke backfill in the vicinity of the ends of the feeding element and incorporation of alien hydrogen ions into the electrode material (in cathodic operation), and dissolution of the feeding element at its ends (in anodic operation).

Characterizing Features of a Development of the Invention with Respect to the Backfill According to a favorable development of the invention, a sub-electrode, of which an active part of its surface is in electric contact with a second conducting medium, that is, for example, soil, is equipped with at least two electrically non-conducting sub-electrode barriers, spaced apart along the sub-electrode and having a substantial extension outwards from the active part of its surface into the second medium.

This is also illustrated in FIGS. 8A and 8B, where the sub-electrode is equipped with two electrically non-conducting sub-electrode barriers 82a, 82b, in the embodiment as illustrated in FIGS. 8A–8B, located with one barrier at each end 103,104 respectively, of the sub-electrode. The sub-electrode barriers 82a, 82b are made of a non-conducting material, chosen such that they maintain their non-conducting properties during the service lifetime of the electrode, for Instance certain qualities of rubber or of plastics like polyethylene or polypropylene. In the embodiment illustrated in FIGS. 8A–8B, they have the shape of circular discs, projecting from the envelope surface of the sub-electrode in a direction in such a way that their planes are substantially perpendicular to the longitudinal direction of the cylindrical sub-electrode. The active part SS of the surface of the backfill is in this case delimited by border lines BL', BL" along which the envelope surface of the backfill adjoins the respective sub-electrode barriers.

Thus, with feeding elements provided with element barriers according to the invention, a more homogeneous current distribution along the active surface of the feeding element can be achieved. The negative effects of local high current density on the feeding element, such as low utilization of the feeding element and enhanced local dissolution of its material, are then substantially reduced.

As will be understood from the above explanation of the function of the element barriers, the sub-electrode barriers 82 will have a similar homogenizing effect on the current distribution along the active part of the surface of the sub-electrode. The negative effects of local high current density on that part of the surface, such as enhanced local dissolution of backfill at the border between the backfill and the surrounding soil, local heating of the soil and enhanced risk for soil drying up as a result of electro-osmotic processes, are then substantially reduced.

Figure 8C:
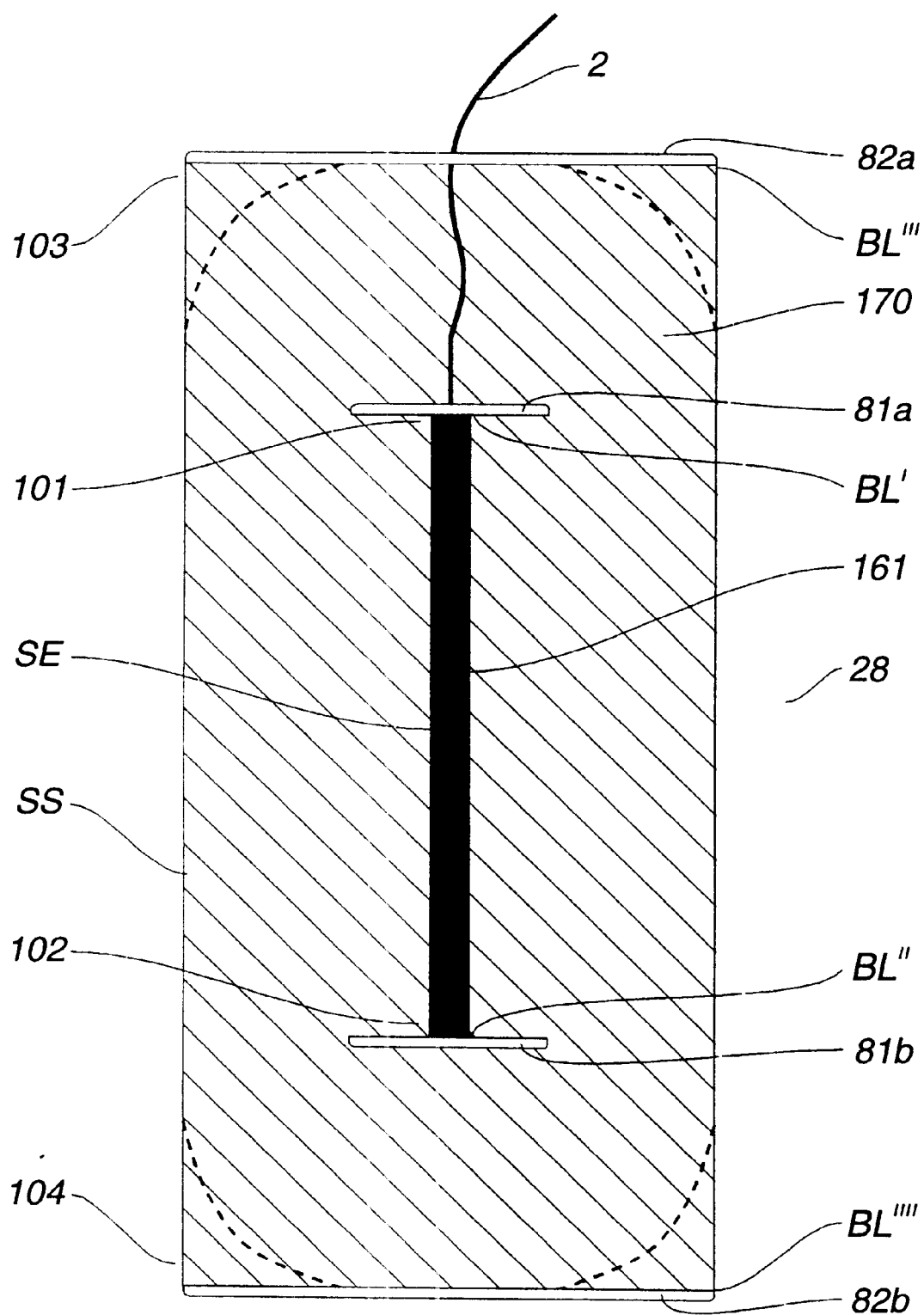
FIG. 8C shows an alternative embodiment of the invention with respect to the backfill.

An alternative embodiment of the invention with respect to the backfill is illustrated in FIG. 8C. The sub-electrode barriers 82a, 82b have in this case substantially the same diameter, that is the same cross-section dimension, as the original diameter of the backfill 170. When the sub-electrode is put into operation, a deterioration process as described in connection with FIG. 7A may start, leading to coke dissolution, in particular at the border lines BL'" and BL"", corresponding to the pockets P3 in FIG. 7A. As is understood from above, the homogenizing effect of the sub-electrode barriers will, during this process, gradually influence the current distribution along the active part of the sub-electrode, so as to achieve a more homogeneous current distribution along the active part of the surface of the sub-electrode. Eventually, an equilibrium state is reached, wherein, at the ends 103,104 of the backfill, the diameters of the sub-electrode barriers are greater than the diameters of the backfill comprising undissolved coke, and wherein the surface of the undissolved coke, indicated with dashed lines in FIG. 8C, exhibits an acute angle with the plane of the sub-electrode barriers. The deterioration process will then come to an end or at least slow down to a very low rate, and the effect of the sub-electrode barriers will become similar to the one described in connection with FIGS. 8A–8B. In this alternative embodiment, the embedding of the sub-electrode in the soil layer 28 (not shown in the Figure) is facilitated, although a certain amount of coke will be dissolved before the effect of the sub-electrode barriers will be fully developed.

The embodiment as described in connection with FIG. 8C will be advantageous where the soil layer has a low electro-osmotic rate, such as for example sandy soils. In other soils, for example clay, an embodiment of the invention as illustrated in FIG. 8D is favorable with respect to electro-osmotic processes in the soil layer in which the sub-electrode is embedded.

Figure 8D:
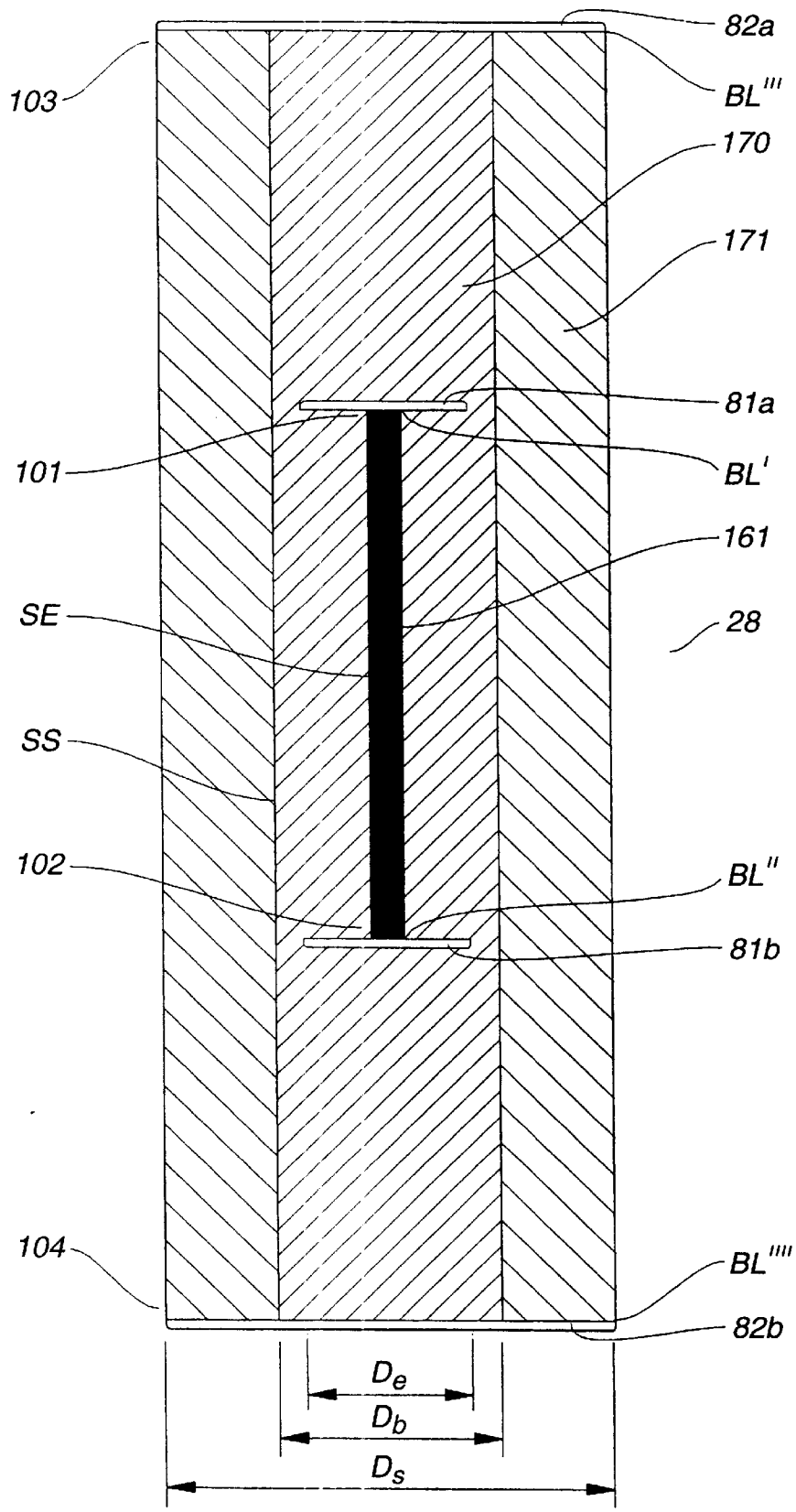
FIG. 8D shows another alternative embodiment of the invention with respect to the backfill.

FIG. 8D shows a sub-electrode of similar kind as described in connection with FIG. 8A (the feeder cable 2 is not shown), however, according to this embodiment of the invention, the backfill comprises a first backfill layer 170 of coke, surrounded by a second conducting backfill layer 171 of a material with a low electro-osmotic rate, such as for example sand. The diameter of the element barriers 81a, is indicated with De and the diameter of the first backfill layer 170 with Db, where Db is greater than De. The inner diameter of the second backfill layer 171 is equal to Db and the outer diameter of the second backfill layer 171 is indicated with Ds. The sub-electrode barriers have a substantial extension outwards from the active part SS of the surface of the first backfill layer in the direction of the second backfill layer, in this example the diameter of the sub-electrode barriers 82a, 82b is equal to the diameter Ds of the second backfill layer. With the second backfill layer 171, the risk of creation of zones of soil drying up, such as the zones P4 and P5 described in connection with FIG. 7A, in soil layers with a high electro-osmotic rate is avoided or at least substantially reduced. To reduce generation of chlorine in the second backfill layer, known suitable chemical components can preferably be added to this backfill layer.

For the case that the cross-sections of the backfill layers and/or the shape of the barriers are not circular, their respective cross-section dimensions are to be related to each other as described above for their respective diameters.

From an electro-chemical point of view, it is important that the electric contact, that is the contact pressure, between the first backfill layer and the feeding element is maintained during the service life of the electrode. To maintain this contact pressure, in particular at the ends of the feeding element, that is at the border lines BL' and BL" as indicated in FIGS. 8A–8D, the element barriers 81a and 81b can preferably be manufactured from a material that render them flexible in such a way that the pressure from those portions of the first backfill layer that are located on the other side of the element barriers, as seen from the feeding element, will tend to bend the peripheral parts of the element barriers in a direction towards the feeding element. With the feeding element arranged with its length axis substantially in a vertical direction, it might be sufficient that at least the upper element barrier (element barrier 81a in FIGS. 8A–8D) is manufactured from such a material.

Figure 8E:
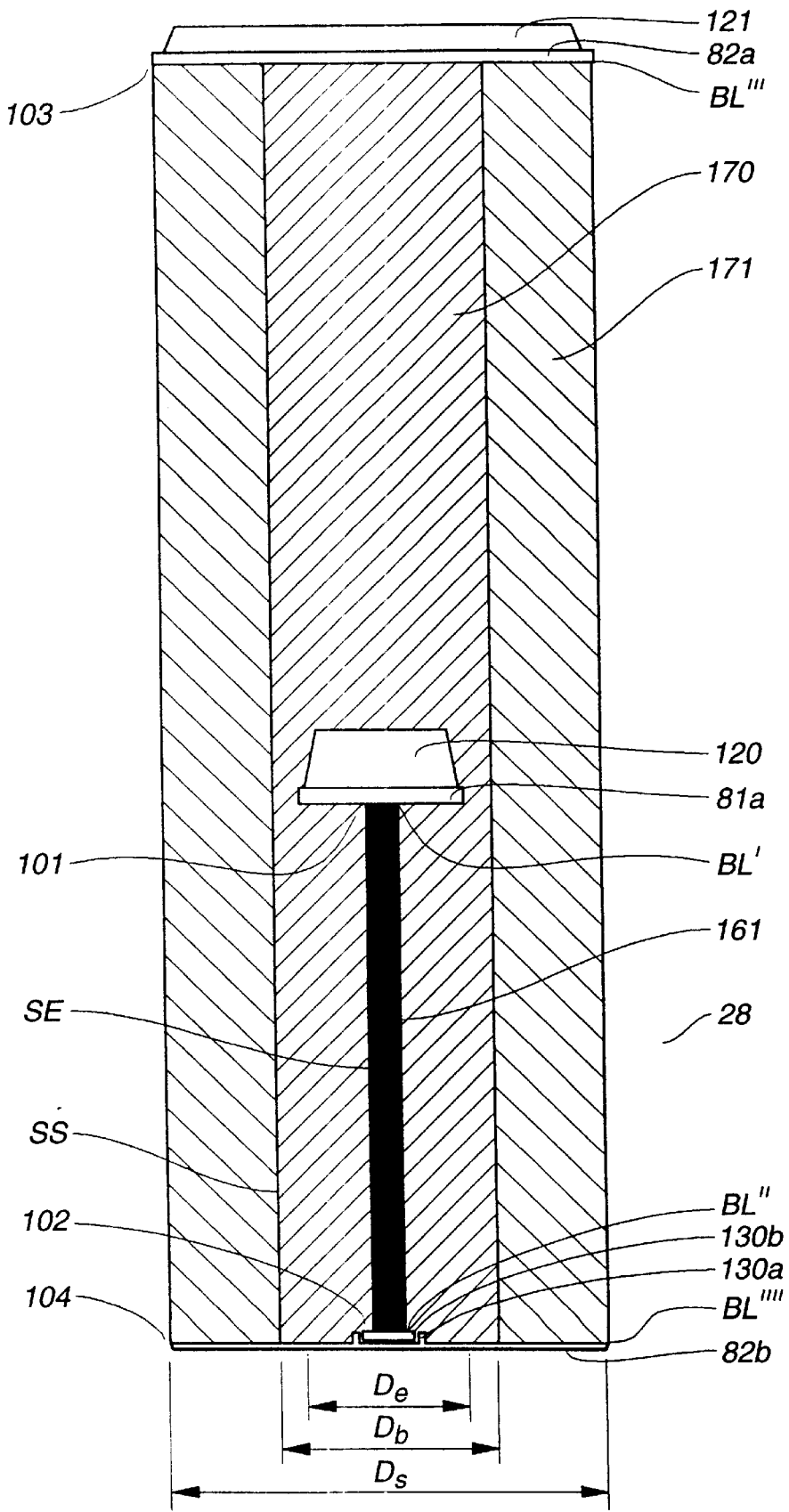
FIG. 8E shows a development of the invention with respect to the feeding element.

A development of the invention with respect to the feeding element is illustrated in FIG. 8E. Where applicable, the description of the embodiment according to FIG. 8D is also valid also for the development of the invention according to FIG. 8E, and similar parts are indicated with same reference numbers. The embodiment according to FIG. 8E differs from the embodiment according to FIG. 8D in the following respects. The element barrier 81a is arranged movable along the feeding element 161 in its length direction, so that, with the feeding element arranged with its length axis substantially in a vertical direction, the element barrier will exert a pressure on the portion of the first backfill layer that is located below the element barrier. Furthermore, to increase the pressure exerted by that portion of the first backfill layer which is located above the movable element barrier, the element barrier is provided with a top weight 120. Another top weight 121 is also placed on the top of the sub-electrode barrier 82a. With these arrangements, it is possible to maintain the contact pressure and the electric contact between the first backfill layer and the feeding element and between the first and the second backfill layers also for the case that settlings should occur within the sub-electrode and/or in the surrounding soil layer 28 (not shown).

The feeding element, in the embodiment illustrated in FIG. 8E is located close to the sub-electrode barrier 82b, whereby one of the element barriers (element barrier 81b in FIG. 8D) can be dispensed with, the sub-electrode barrier 82b serving for all practical purposes also as an element barrier. To reduce the risk that the feeding element should break due to, for instance, the above mentioned settlings, a feeding element bottom assembly 130 is arranged at the sub-electrode barrier 82b. This bottom assembly comprises a cup-shaped part 130a being (as indicated in the Figure) an integral part of, or alternatively, fixed at the sub-electrode barrier and a disc-shaped member 130b fixed at the feeding element. The disc-shaped member, which is placed inside the cup-shaped member and rests against the bottom of it, has cross-section dimensions such that the bottom assembly allows for relative movements between the sub-electrode barrier and the feeding element in a direction perpendicular to the length axis of the feeding element.

Figure 4A:
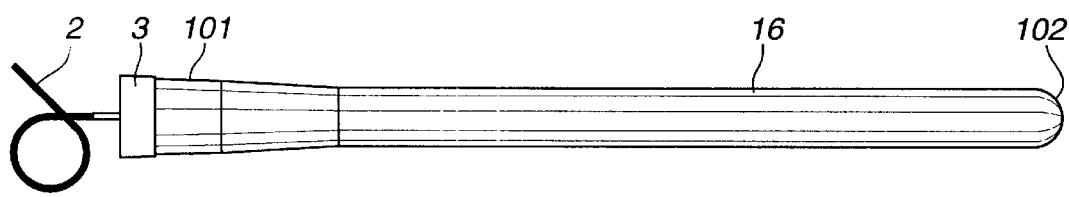
FIGS. 4A–4B shows prior art feeding elements.
Figure 4B:
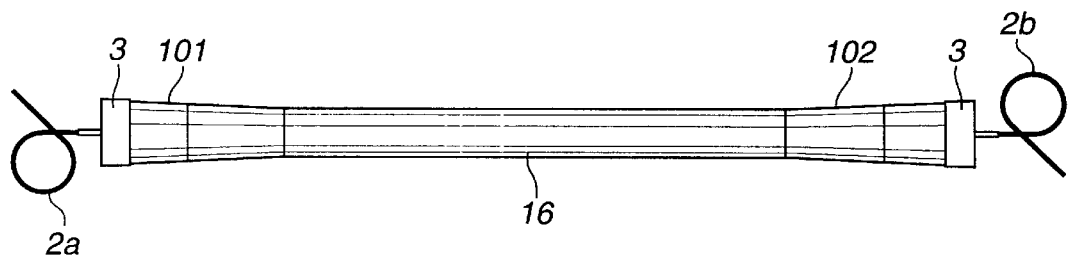
Figure 8F:
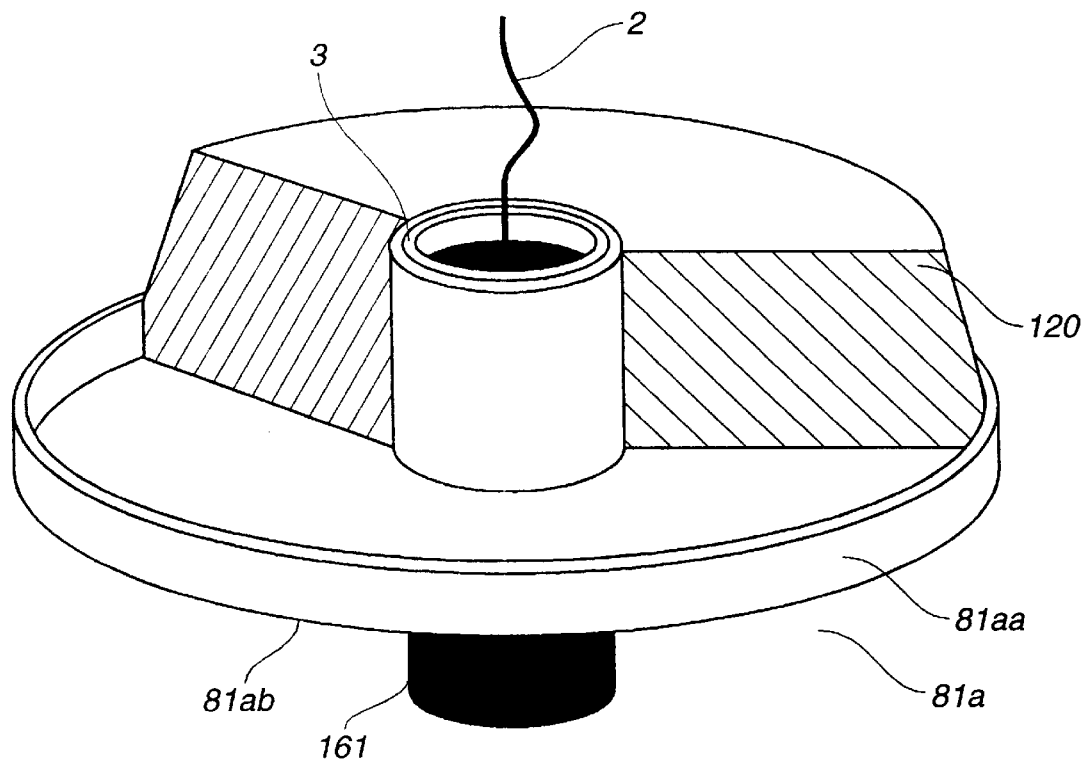
FIGS. 8F–8G show details of the development of the invention according to FIG. 8E.
Figure 8G:
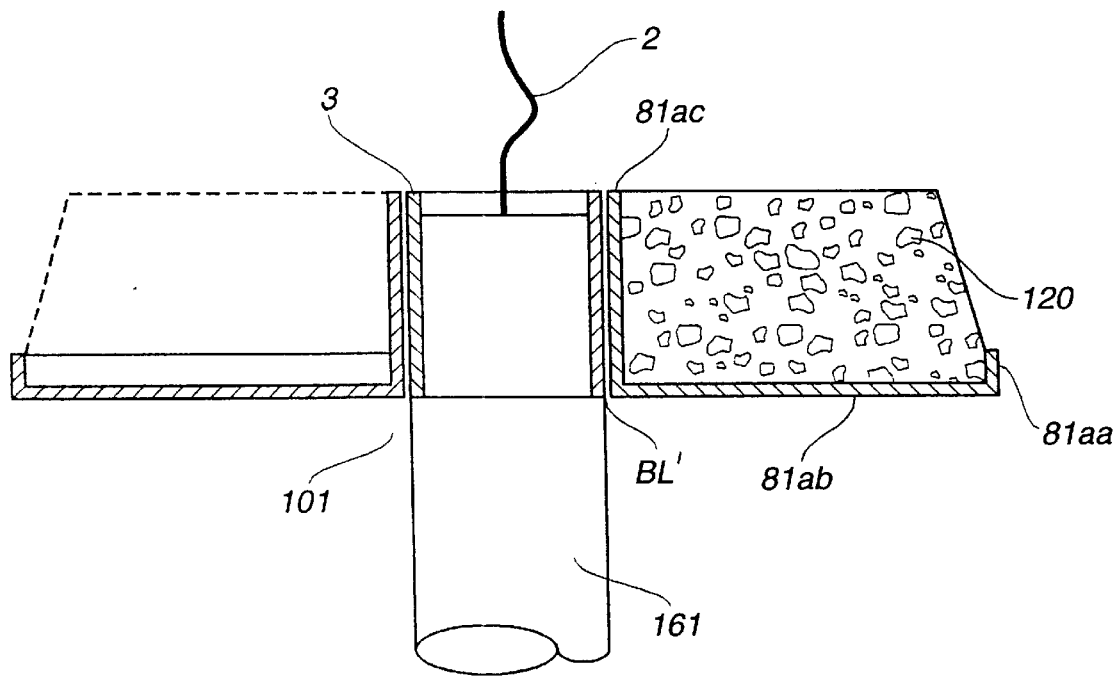

Details of an embodiments of the top weight 120 and the element barrier 81a are schematically illustrated in FIGS. 8F and 8G. FIG. 8F illustrates in a perspective view an element barrier 81a provided with a rim 81aa. The top weight 120 is in the shape of a thick massive plate, made of for example steel armored concrete. FIG. 8G illustrates a cross section along the length axis of the feeding element through the top weight and the element barrier of FIG. 8F, as well as the end 101 of the feeding element 161. The element barrier has a disc-spaced part 81ab facing the active part of the surface of the feeding element and a cylinder-shaped part 81ac serving as a hub for the barrier. The end of the feeding element is provided with a protecting sleeve 3, made of a non-conducting material, as described in connection with FIGS. 4A–4B. The border line BL' of the active part of the surface of the feeding element is located at the inner (movable) edge of the disc-spaced part 81ab of the element barrier.

Although the movable element barrier in FIG. 8E is illustrated as a development of the embodiment of the sub-electrode described in connection with FIG. 8D, it is obvious that the concept of a movable element barrier can also be applied to the embodiments of the invention as described in connection with FIGS. 8A–8C.

To avoid any corrosion of the steel armoring caused by currents entering the concrete of the top weights, all their surfaces can preferably be coated with a non-conducting material.

Figure 8H:
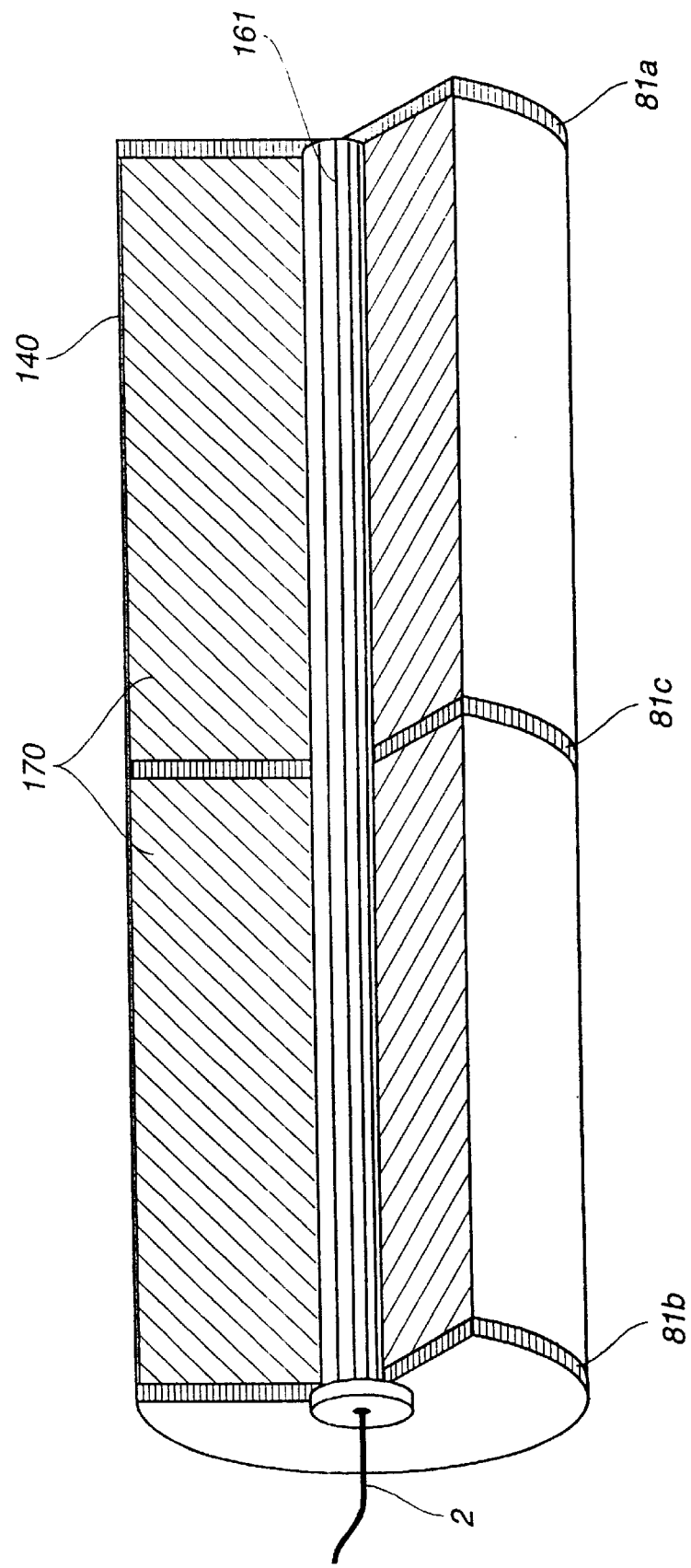
FIG. 8H shows another development of the invention with respect to the feeding element.

The feeding elements are often made of a brittle material, such as silicon iron, graphite or magnetite. A development of the invention with respect to the feeding element is illustrated in FIG. 8H. The figure shows schematically a sub-electrode in a perspective and cut-up view. Where applicable, the description of the embodiment according to FIG. 5 is also valid for the development of the invention according to FIG. 8H, and similar parts are indicated with same reference numbers. The embodiment according to FIG. 8H differs from the embodiment according to FIG. 5 in the following respects. In addition to the two element barriers 81a and 81b, a third element barrier 81c, similar to these other element barriers, is placed in between them. According to this development of the invention, a cylindrical metal tube 140, for example made of steel, encloses the feeding element so as to form together with the two end barriers 81a, 81b a closed canister containing the feeding element. The canister is filled with a backfill 170, for example of coke. In this way, a mechanically robust package is achieved, which can easily be embedded in the ground. The homogenizing effect of the barriers on the current distribution at the electrode, will, with an arrangement according to FIG. 8H, be similar or, at least temporarily, even better than as described in connection with FIGS. 8A–8B and FIG. 9. When the sub-electrode is put into operation, the current distribution along the feeding element will initially be quite even, as the arrangement will behave like a cylindrical capacitor. The metal tube will then, in course of tim-C, gradually dissolve, starting at the parts closest to the barriers 81a and 81b, where the current density at the metal tube is highest. In a transition phase, where the ends of the remaining part of the metal tube no longer touches the barriers 81a, 81b, that remaining part, which surrounds the feeding element, may still contribute to the homogenization of the current distribution at the feeding element, as it usually has a specific resistivity which is lower than the specific resistivity of the backfill. Finally, the metal tube is completely dissolved and the barriers will influence the current distribution as described in connection with FIGS. 8A–8B and FIG. 9.

Alternative Embodiments of the Invention with Respect to the Feeding-element

In certain cases, especially for long feeding elements, a plurality of element barriers, spaced along the whole feeding element, can be used to obtain the desired homogenizing effect. The same effect as described above is then achieved for each part of the feeding element located between two adjacent element barriers, spaced along the cylinder with the distance 2L between them, and with each element barrier having the height ratio h/L. Studies have shown that an overall optimized homogenizing effect for a feeding element can be achieved with different distances between pairs of adjacent barriers.

Substantially, the same homogenizing effect can be achieved also with element barriers and feeding elements with different geometries. Thus, the element barriers as described in connection with FIG. 8 must not necessarily be in the shape of circular discs, but could also be in the shape of plates with, for example, a rectangular or quadratic form. Also as an example, for a cylindrical feeding element, the element barriers could exhibit a convex surface towards that part of the feeding element on which the homogenizing effect is desired. However, the homogenizing effect achieved will depend on the dimensions of the element barriers as projected on a plane substantially perpendicular to the active part of the surface of the feeding element, as well as on the shape of the element barriers.

Figure 10:
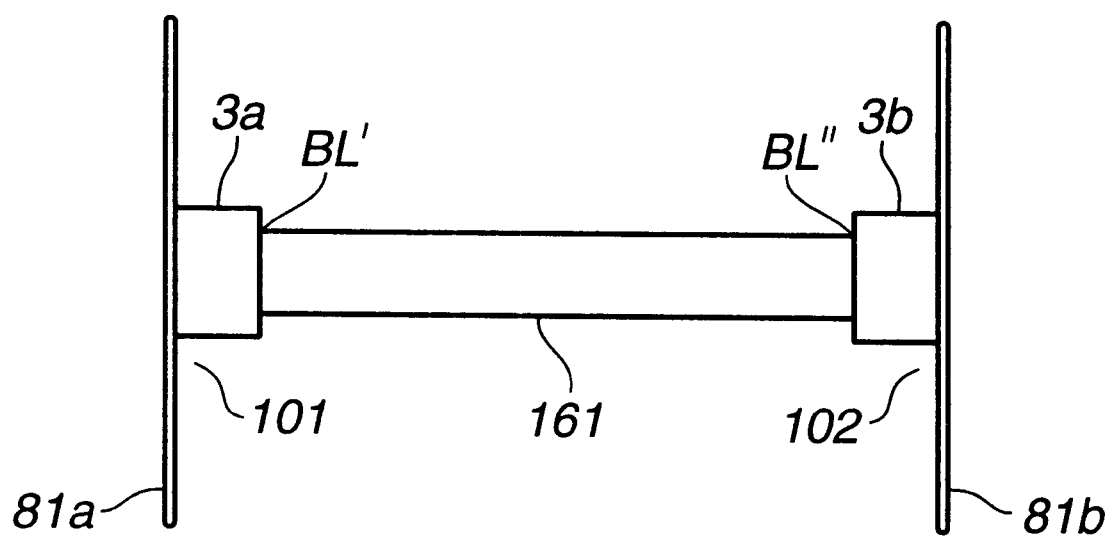
FIG. 10 illustrates schematically a cylinder-shaped feeding element with element barriers according to the invention.

FIG. 10 shows a cylinder-shaped feeding element 161 equipped with two element barriers 81a, 81b, one at each end 101,102, respectively of the feeding element. To facilitate mounting of the element barriers and to give mechanical support in the mounted position, each element barrier comprises a sleeve 3a, 3b respectively, of the same material as the material of the barrier. In mounted position, the sleeves envelop the end parts of the feeding element. The active part of the surface of the feeding element is the part of its surface which is not covered by the sleeves and by the element barriers. Border lines BL', BL" of the active part S of the surface of the feeding element is in this case the lines along which the envelope surface of the feeding element adjoins the respective sleeve, that is, at the edges of the sleeves facing the active part of the surface.

Theoretically, the element barriers are preferably located at these border lines, but for practical purposes, a sufficiently homogenizing effect on the current distribution is also achieved when the barriers, for instance for mechanical design reasons as described above, are displaced from these border lines along the longitudinal direction of the feeding element. However, the displacement of the element barriers from the mentioned border lines is preferably be small in relation to the dimensions of the element barriers in a plane perpendicular to the active part of the surface, so that the element barriers are located at or close to these border lines, the wording 'close to' to be understood as meaning so close that the desired homogenizing effect of the element barriers is achieved.

Also, theoretically, it is preferable that the element barriers, at least at the surface of the feeding element, project in a direction which is substantially perpendicular to the active part of the surface of the feeding element. However, for practical purposes, an embodiment of the invention where, for example, the element barriers exhibit a convex surface towards that part of the feeding element on which the homogenizing effect is desired, can also be designed to achieve the desired homogenizing effect, provided the dimensions of the element barriers, as projected on a plane substantially perpendicular to the active part of the surface of the feeding element are made sufficiently large.

The same considerations apply, mutatis mutandis, also to the sub-electrode barriers.

Design of the Electrode with Respect to Size in Homogeneous Soil

The current distribution between sub-electrodes (and between sections and sub-sections of sub-electrodes) is influenced by the shape of the contour line(s) of the electrode. In the ideal situation where the electrode is embedded in an electrically homogeneous soil, this current distribution is homogeneous only when the contour line(s) of the electrode coincides with a circle.

As mentioned above, it is preferable to try to reduce the size of the electrode so that the soil can be assumed to be homogeneous in the vicinity of circular contour lines. In this context, it has to be taken into account that the current density in the soil must not exceed a certain value, specified for the site. However, with sub-electrodes designed according to the invention and to developments of it as described above, so that the current distribution along the active parts of their surfaces is homogenized to a desired degree, it is possible to design the electrode to comprise contour lines in the shape of more than one circle and to locate the sub-electrodes (and sections and sub-sections of subelectrodes) as well as the contour lines closer to each other than would otherwise be the case with sub-electrodes exhibiting local high current densities at their surfaces. Studies have shown that it is even possible to design the electrode to comprise contour lines in the shape of three concentric circles, which, as far as is known, has not been done before.

Design of the Electrode with Respect to Size in Inhomogeneous Soil and with a Desired Current Distribution Between Sections The current distribution between sub-electrodes (and between sections and sub-sections of sub-electrodes) depends significantly on how electrical, thermal and hydrological parameters of the soil surrounding the surface of the active part of the electrode varies along the electrode.

Thus, if these soil parameters are significantly inhomogeneous, that is, that the electrode has an extension such that different parts of it are located in soil layers with significantly different parameter values, the sub-electrodes (and as the case may be, sections and sub-sections of sub-electrodes) are designed and operated taking into account these different parameter values. It is then possible to get a desired current distribution in the different soil layers, that is, usually using the highest possible allowable current density for each of the soil layers.

Analysis of prior art land electrodes has shown that usually the same type of sub-electrodes are used for all of the electrode body, and also that their intermediate distances do not change along the entire contour line of the electrode. Such designs do not allow for a desired optimum current distribution, taking into account the above mentioned parameter variations, notwithstanding that the probability of such variations increases with increased extension of the contour.

Thus, in such a situation it is proposed, in dependence on the actual extension of soil layers with varying properties, to distribute the sub-electrodes along circular contour lines with unequal intermediate distances, and to arrange the sub-electrodes with a vertical orientation or with combinations of vertically and horizontally oriented sub-electrodes.

Depending on the actual conditions at site, it might also be preferable to give the contour lines irregular, that is non-circular, shapes.

Figure 11:
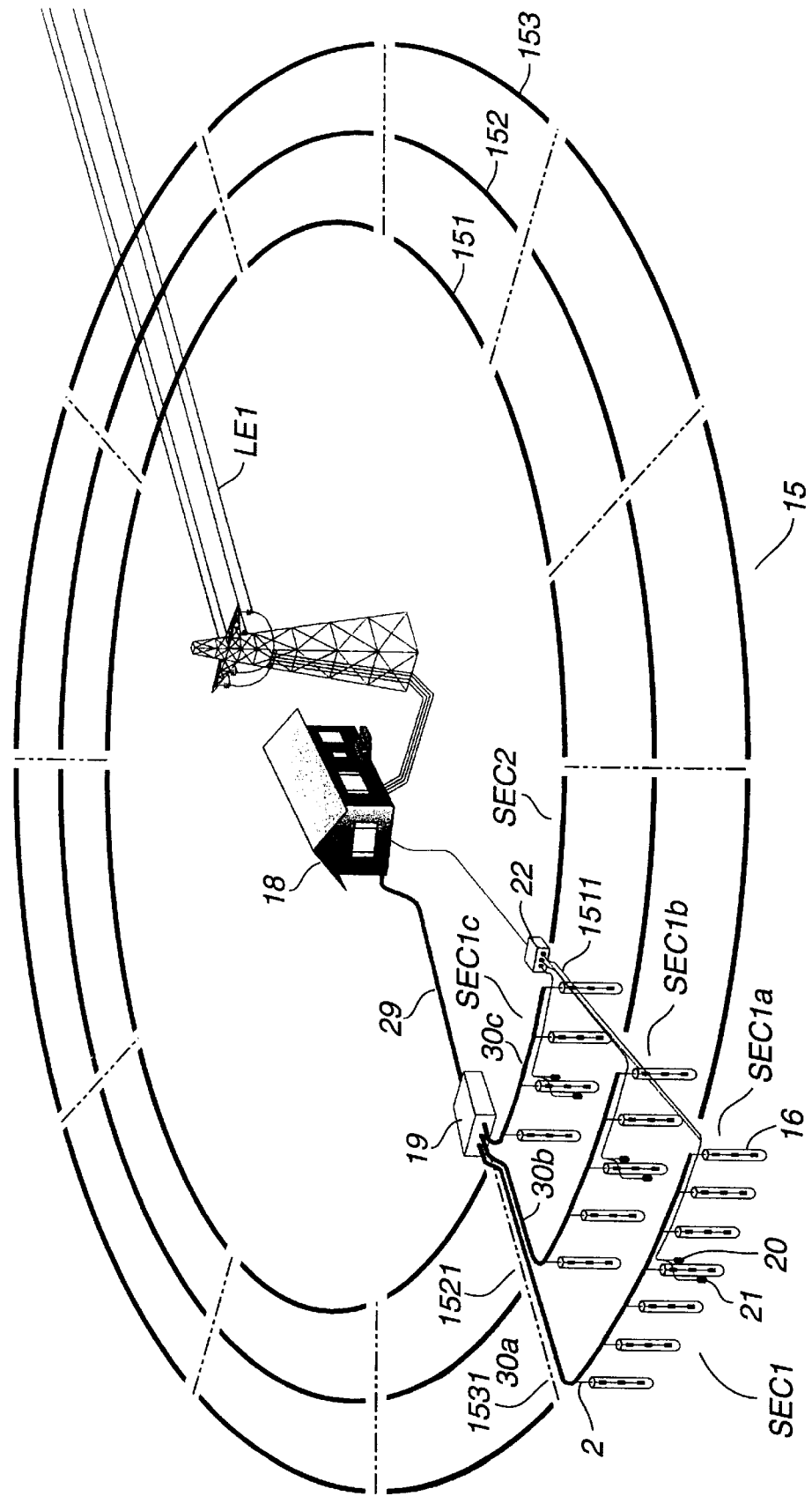
FIG. 11 shows a perspective view of a typical layout for a land electrode according to a development of the invention.

FIG. 11 shows in a perspective view a typical layout of a land electrode 15 according to a development of the invention. It comprises a plurality of vertically oriented sub-electrodes 16, of the kind described in connection with FIGS. 8A–8B.

For the sake of simplicity, only one sub-electrode is indicated with its reference number. The sub-electrodes are arranged in sections SEC1, SEC2, . . . , each occupying a sector of a circle. For the sake of simplicity, only a section SEC1 of sub-electrodes is shown in the Figure, but it is to be understood that all sectors comprise such sections of sub-electrodes. The DC current from an electrode line LE1 is transmitted via a control building 18 and a section feeder cable 29 to a section connection box 19. The section SECT comprises three subsections SEC1a, SEC1b, SEC1c of sub-electrodes, the sub-section SEC1a being located along a contour line 1531, the sub-section SEC1b along a contour line 1521 and the sub-section SEC1c along a contour line 1511, each in the shape of a circular arc with a different radius. The contour lines of all the sub-sections of the electrode thus coincide with three concentric circles. Each sub-section is coupled to the section connection box via section interconnection cables 30a, 30b and 30c respective. The part of the respective section interconnection cable which is directed along the circumference of the mentioned circles thus gives the trace of the contour line for the respective sub-section. Each sub-electrode is coupled to the respective section interconnection cable with a sub-electrode feeder cable 2. Temperature sensors 20 and humidity sensors 21 for supervision of soil temperature and soil humidity, the parameters most relevant for the soil resistivity, are indicated in the Figure, located at one sub-electrode in each subsection. The sensors are connected to a sensor connecting box 22, and further to a supervision unit (not shown) in the control building, for supervision of the operating conditions of the electrode.

FIGS. 12–13,15A–15B and 16 illustrate advantageous developments and implementations of the invention, in particular preferable when the electrode has an extension over soil layers with different properties, such as conductivity properties and electro-osmotic characteristics.

Characterizing Features of a Development of the Invention with Respect to Sections and/or Sub-sections Located in Soil Layers with Different Properties According to another development of the invention, which will be further described below, favorable where the electrode is located in inhomogeneous soil it is proposed to design the electrode, with respect to the soil properties in which the respective section is located, with contour lines which do not form closed curves, for instance as one or more circular arcs, comprising one or more sections, interspersed with areas not comprising any sub-electrodes.

Figure 12:
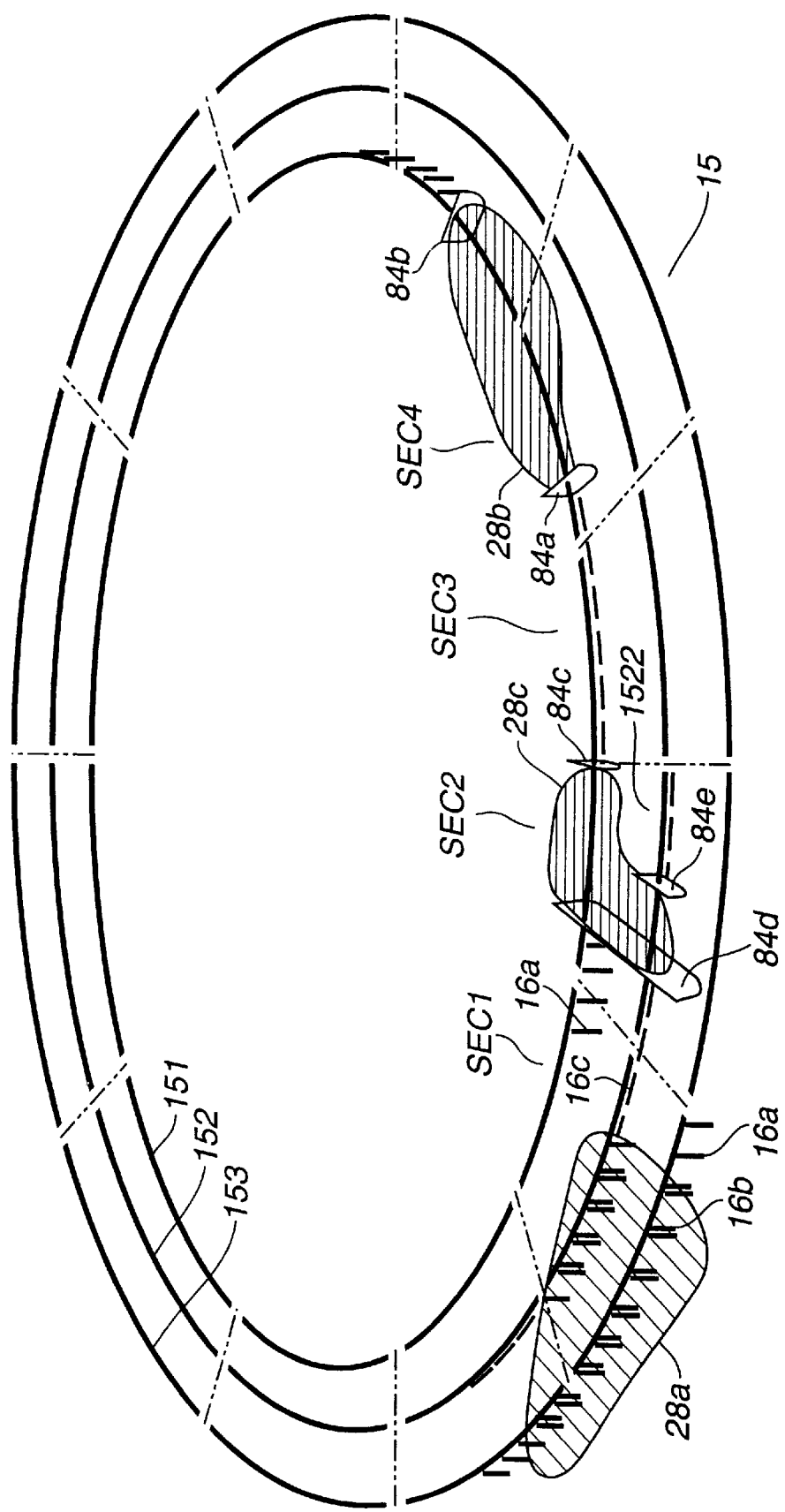
FIG. 12 shows a schematic perspective view of a land electrode of a similar structure as the one illustrated in FIG. 11, arranged according to the invention and its developments.

FIG. 12 shows a schematic perspective view of a land electrode 15, of a similar structure as the one illustrated in FIG. 11. The electrode comprises a plurality of sub-electrodes 16, only some of which are shown and indicated in the Figure. The sub-electrodes are of the kind described in connection with FIGS. 8A–8B, and some of them are oriented with their longitudinal direction in a horizontal direction (indicated with 16c) and some of them with their longitudinal direction in a vertical direction (indicated with 16a, 16b). The sections and the sub-electrodes are fed as described in connection with FIG. 11, although in this figure, the feeder and interconnection cables are not shown.

The contour lines pass through soil layers with different properties. The contour lines along the circles 152 and 153 pass through a soil layer 28a, assumed to have poor conductivity properties as compared to other layers through which the lines passes. As indicated in the Figure, the number of sub-electrodes (indicated with 16b) per length unit of the contour lines is higher within this layer than outside it (sub-electrodes 16a).

The contour line of section SEC4 along the circle 151 passes through a soil layer 28b and the contour line of section SEC2 along the same circle a soil layer 28c, both layers assumed to have a high electro-osmotic rate as compared to other layers through which the contour lines pass. Also, the contour line 1522 of the section SEC2 along the circle 152 passes through the soil layer 28c. According to a development of the invention, the soil layer 28b is, along the circumference of the circle 151, delimited from the neighboring soil layers by two vertically arranged soil border barriers 84a, 84b, made of a non-conducting material or at least having a surface covered with a non-conducting material. The soil layer 28c, along the circumference of the circle 151, is delimited from the surrounding soil layers by two soil border barriers 84c, 84d, of similar kinds as the soil border barriers 84a, 84b. The soil layer 28c, along the circumference of the circle 152, is delimited from the neighboring soil layers by a soil border barrier 84d and the soil border barrier 84e.

Assuming that the electrode operates as an anode, no sub-electrodes are, as indicated in the Figure, located within the soil layers 28b and 28c (for an electrode operating only as a cathode, sub-electrodes could preferably have been located within these soil layers). Thus, along the circle 151, the section interconnection cables for sections neighboring these soil layers are terminated at the sub-electrode closest to the respective soil border barrier, which are in this case the barriers 84a, 84b, 84c and 84d. Also along the circle 152, the section interconnection cables for sections neighboring the soil layer 28c are terminated at the sub-electrode closest to the respective soil border barrier, which are in this case the barriers 84d and 84e. The sub-electrodes located between the soil border barriers 84a and 84c at the circle 151 are of course provided with a separate feeder cable.

As the case may be, separate sections of sub-electrodes may be disconnected in dependence on sensed temperature and/or humidity values, where temperature increase and/or humidity decrease reaches critical levels.

The soil border barriers 84a, 84b, 84c, 84d and 84e will act as barriers for current lines as is explained above in connection with the element barriers and sub-section barriers. The effect of the soil border barriers is to homogenize the current distribution along the respective sub-section and to separate one soil layer from another, thereby making it possible to control the current within each sub-section in principle independent of the current in a neighboring sub-section. The soil border barriers 84a and 84c will thus, in principle prevent current transferred by the sub-section of sub-electrodes located between these barriers to penetrate the soil layers 28b and 28c, making it possible to choose a desired current density in the soil layer between the two last mentioned barriers, independent of the soil properties of the soil layers 28b and 28c.

The soil border barriers can be manufactured in the form of prefabricated pieces, for example structures of concrete coated with a non-conducting material, or molded in the soil at site according to known methods using electroosmosis and electrophoresis treatment of the soil at the location of the barriers, changing its conductivity properties so that a barrier with high resistivity will be formed.

Characterizing Features of a Development of the Invention with Reject to Current Distribution Between Sections and Sub-sections of Sub-electrodes.

According to another development of the invention, which will be further described below, favorable in cases of inhomogeneous soil, it is proposed to control the current distribution between different sections and/or sub-sections of sub-electrodes with respect to the soil properties in which the respective section (sub-section) is located.

According to this development of the invention, tuning resistors are connected in series with the sub-section feeder cables. This makes it possible to tune the current for each sub-section of sub-electrodes, in such a way that each subsection will operate with a desired current with respect to the soil properties in which the respective sub-electrodes are embedded. Such a tuning is in particular feasible as the current distribution within each sub-electrode is homogenized through the effect of the element barriers and of the sub-electrode barriers.

The tuning can be based on known soil data and be performed at the commissioning of the electrode. Retuning can be performed, based for instance on information received from the above mentioned temperature and humidity sensor.

Figure 13:
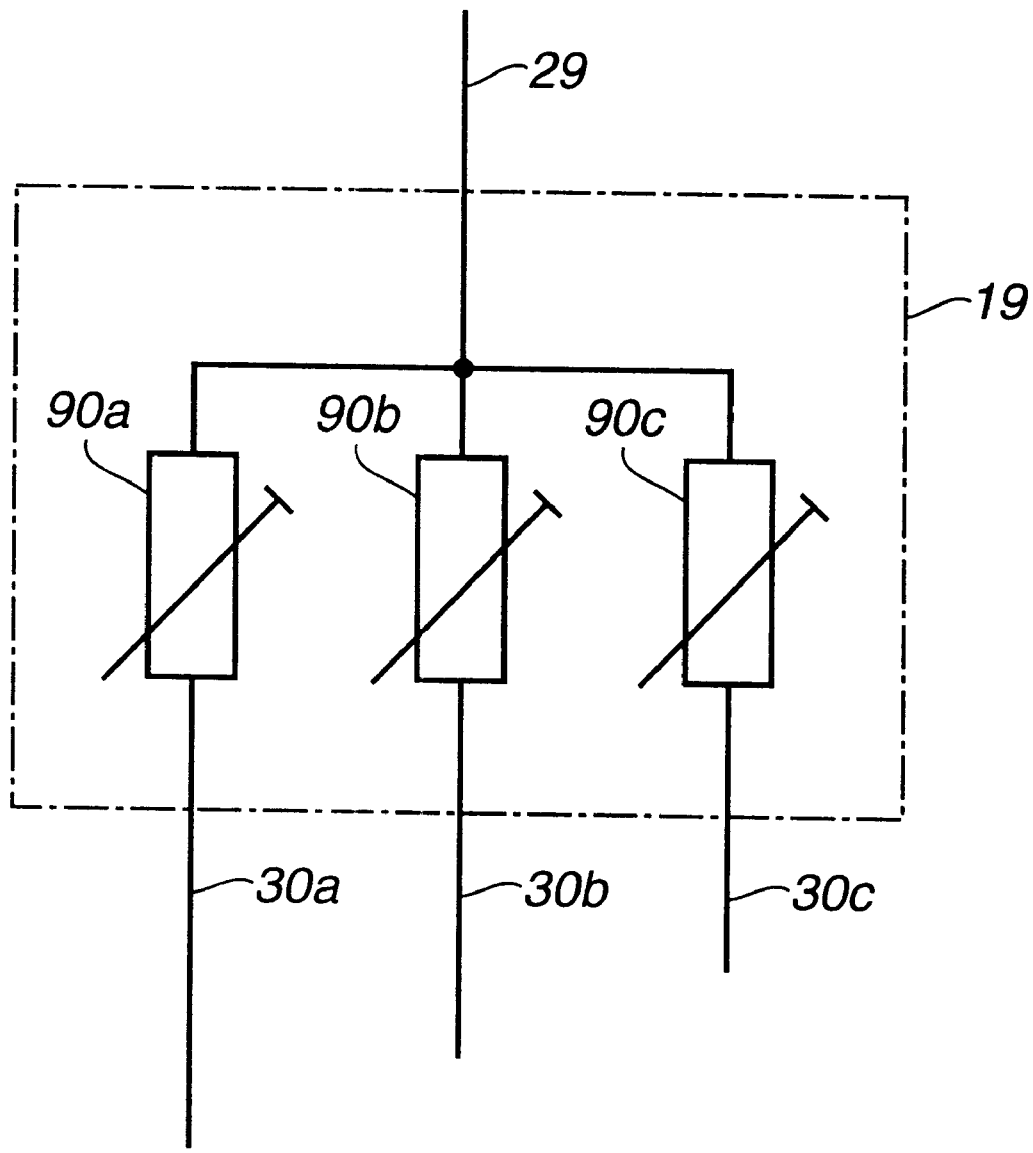
FIG. 13 shows schematically an arrangement of tuning resistors according to a development of the invention.

FIG. 13 shows schematically, with reference to FIG. 11, the principal configuration of a tuning resistor system. The Figure shows the section connection box 19, section feeder cable 29 and the section interconnection cables 30a, 30b and 30c. The section interconnection cable 30a is coupled to the section feeder cable via a resistor 90a, the resistance of which can be changed manually or automatically in a known manner. The resistor is in this case shown located in the section connection box 19. Similarly, section interconnection cables 30b and 30c are coupled to the section feeder cable via resistors 90b and 90c, respectively, of the same kind as the resistor 90a. Where soil border barriers are used, such tuning can of course also be applied to sections of sub-electrodes, making it possible to operate different sections with different currents.

Alternative Embodiments of the Invention and Developments of the Invention

In a particular form of the known land electrodes for grounding of HVDC transmission systems, the feeding elements have the shape of rods, which are arranged in a linear array in a deep vertical hole in the earth. This configuration is often imposed by site conditions, for instance where available area for the electrode at the surface of the site is restricted.

Figure 14:
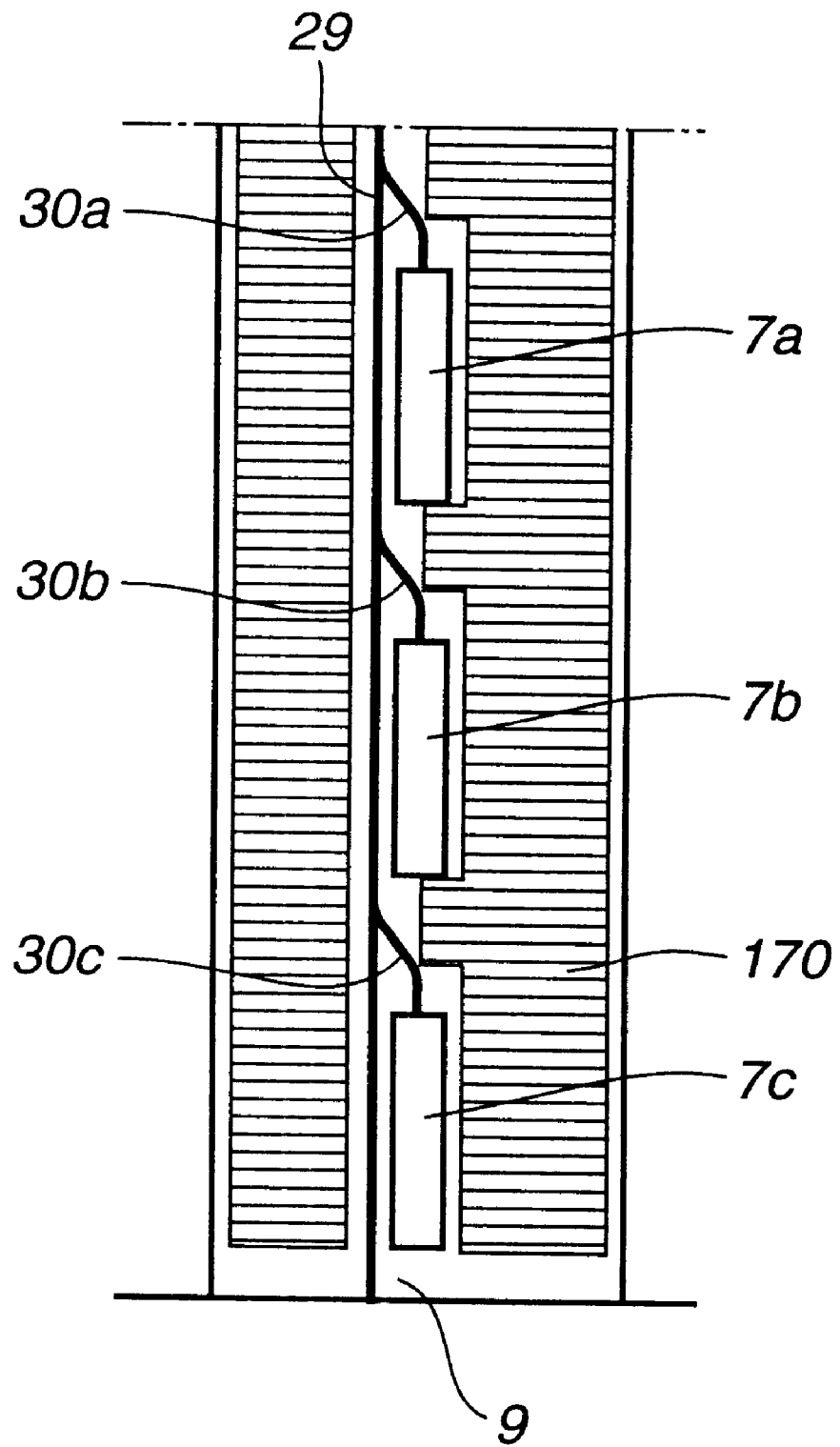
FIG. 14 shows schematically the principal layout of another embodiment of a prior art land electrode.

FIG. 14 shows schematically a part of such a known electrode. The array comprises a plurality of series-connected rod-shaped feeding elements (not shown individually), arranged in sub-sections 7a, 7b, 7c, located in a hole 9 in the ground. The feeding elements are embedded in a backfill 170 and coupled to the electrode line via an underground cable (not shown). The sub-sections are via section interconnection cables 30a, 30b, 30c, respectively, connected in parallel to a busbar 29, fed from the underground cable, and extending along the sections in the hole.

Figures 15A, 15B:
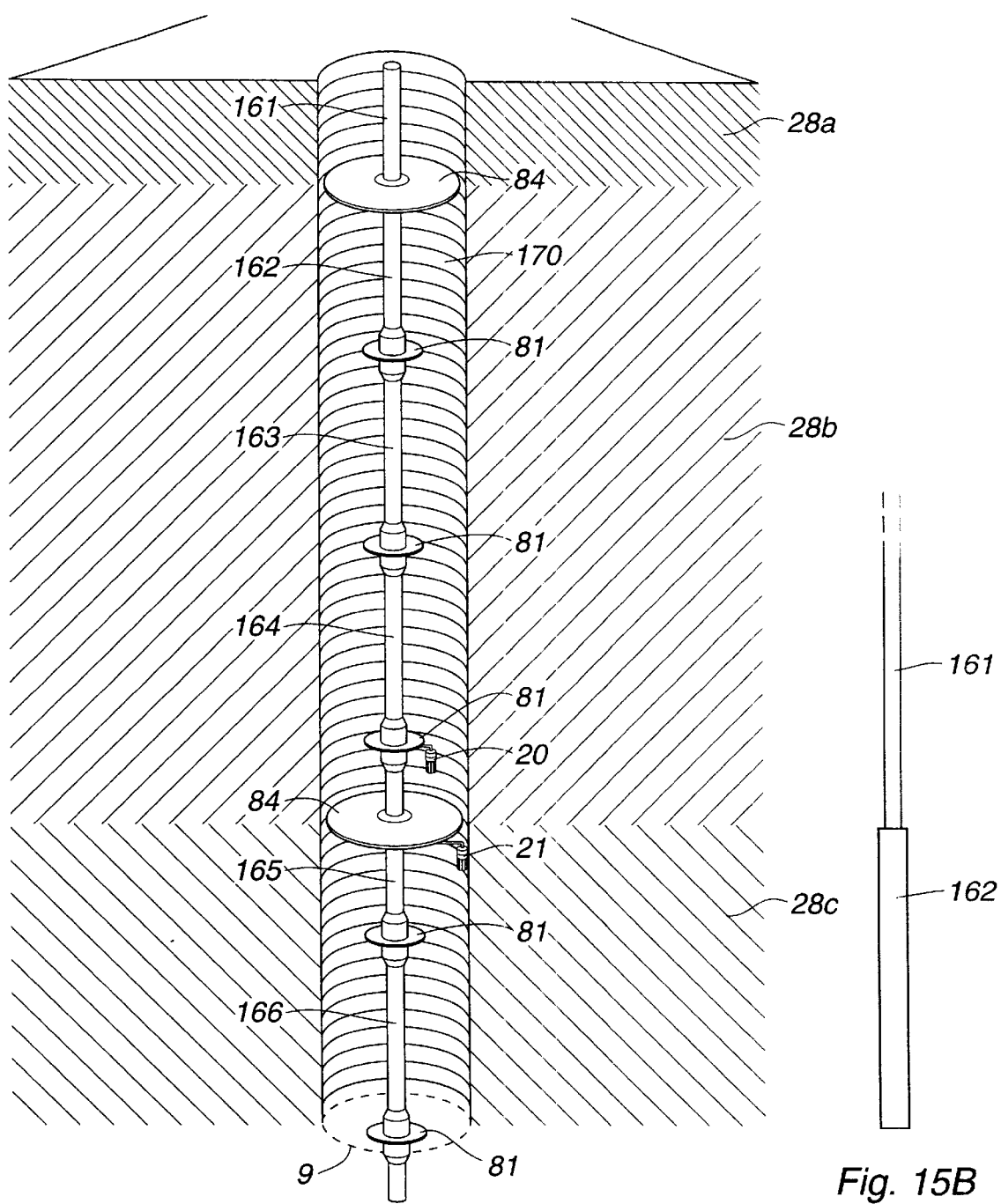
FIG. 15A shows schematically the principal lay out of a part of an electrode of the same type as shown in FIG. 14, but according to the invention and its developments.
FIG. 15B shows feeding elements of different diameters, series connected to each other.

FIG. 15A shows in simplified form the principal lay out of a part of an array of such a land electrode according to the invention. A plurality of series connected feeding elements 161,162,163,164,165,166 of substantially cylindrical shape, are embedded in a backfill 170 of coke, in principle forming sub-electrodes of similar kind as the ones described in connection with FIGS. 8A–8B, although, in this case the cross section surfaces of the backfill coincide with the cross section surfaces of the feeding elements. According to the invention and in analogy with the principles described above, the feeding elements are equipped with element barriers 81 to homogenize the current distribution along the parts of the feeding elements located between the element barriers.

The part of the array shown in the figure passes through three different soil layers 28a, 28b, 28c with different soil properties, for instance as mentioned above in connection with FIG. 12. Horizontally oriented soil border barriers 84 are located at the borders between such soil layers.

For example, in a case where a feeding element passes a border between soil layers with different electric conductivity properties, the current density at the surface of the feeding element will change at the mentioned border, in dependence on the change in the soil conductivity. The soil border barriers will also in this case have the same homogenizing effect on the current distribution as has been described above in connection with FIG. 12. They will also in the same way separate one soil layer from the other.

In this implementation of the invention, the barriers are exemplified as discs of circular shape but can of course also have other shapes as described above. A horizontally oriented soil border barrier can also serve as an element barrier at the same time.

Preferably, the element barriers 81 can be made to serve, in addition, also as mechanical connectors between the feeding elements. Further, soil border barriers can be designed to decrease water penetrating from one soil layer to another.

Temperature and humidity sensors 20, 21, respectively, can be located at selected places, preferably in the vicinity of the borders between different soil layers. For such types of electrodes also pH-sensors (not shown) can be used.

The diameters of the feeding elements, and of the barriers as well as the spacing between the barriers can be chosen to differ for the different soil layers, thereby maximizing the overall current transfer capability of the electrode. As an example, FIG. 15B shows a first feeding element 161 and a second feeding element 162, series connected to each other, wherein the second feeding element has a greater diameter and cross section area than the first feeding element. The shown feeding elements can be located at a border between two soil layers with different electric conductivity properties.

By designing the array of feeding elements in such a way that each sub-section, in analogy with the description in connection with FIGS. 11 and 13, is fed from a separate section interconnection cable, and inserting tuning resistors in each of the section interconnection cables, in analogy with the insertion of tuning resistors in the section interconnection cables as described above, the current can be tuned for each sub-section in such a way that it operates with a desired current value chosen with respect to the soil properties in which it is embedded.

Figure 16:
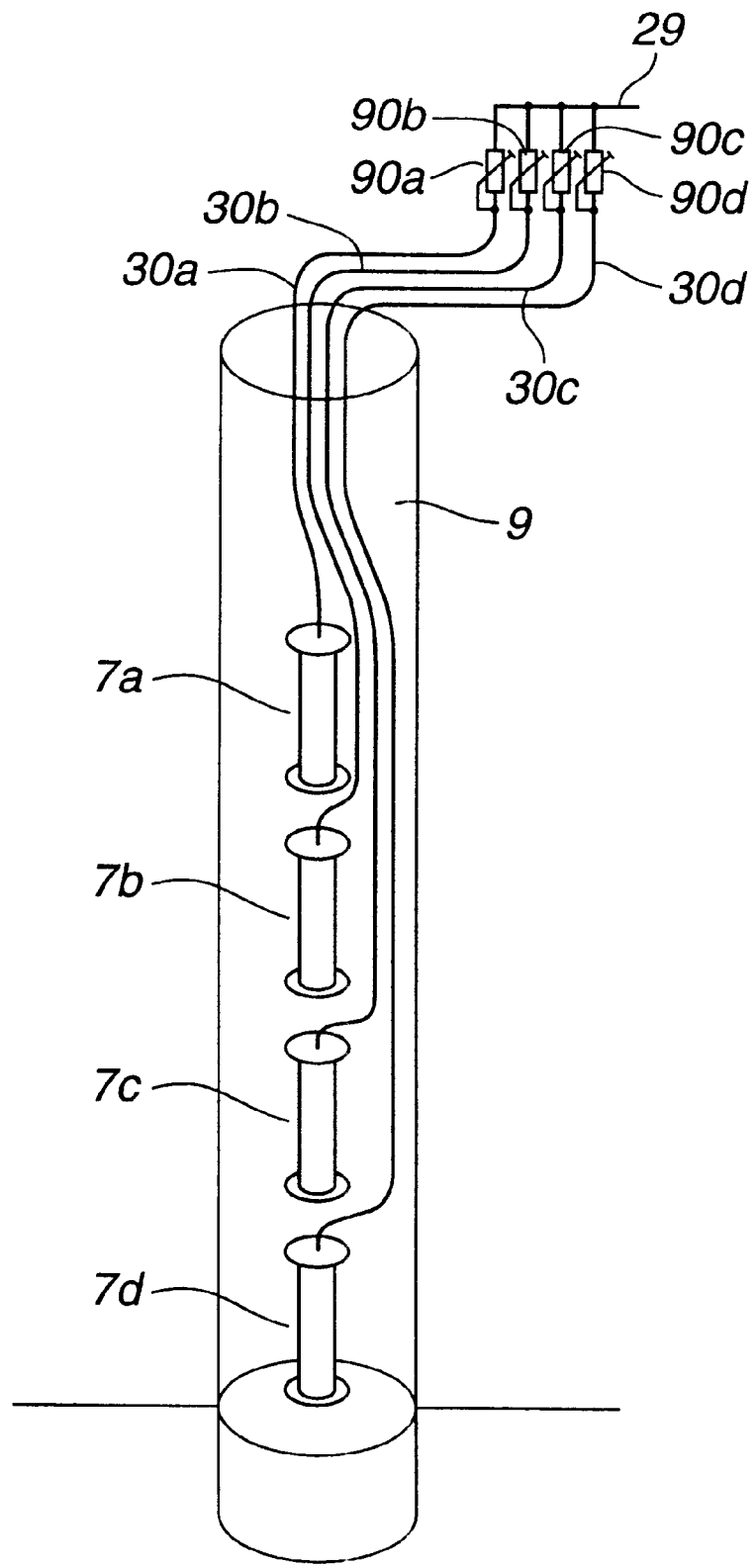
FIG. 16 shows schematically the principal layout for an arrangement of tuning resistors according to a development of the invention, for an electrode of the same type as shown in FIG. 14.

FIG. 16 illustrates the principal layout of such a design. Sub-sections 7a, 7b, 7c, 7d of sub-electrodes are located in an array in a hole 9 in the soil, each section fed via its own section interconnection cable 30a, 30b, 30c, 30d respectively. A tuning resistor 90a is inserted in the section interconnection cable 30a in series with the sub-section 7a and coupled to the section feeder cable 29. The circuits feeding the sub-sections 76, 7c and 7d comprise similar members arranged in the same manner. The tuning resistors 90a, 90b, 90c, 90d can for example be located in a connection box (not shown in the Figure) of similar kind as the section connection box 19 illustrated in FIG. 11.

Advantages Achieved with the Invention and Developments of the Invention

The element barriers will homogenize the current distribution along the active part of the surface of the feeding elements. As a consequence, for electrodes operating as anodes, the dissolution rate of feeding elements will decrease, decreasing the risk for a rupture between the feeding element and its feeder cable. For electrodes operating as cathodes, coke consumption and incorporation of alien hydrogen ions into the material of the feeding element will be reduced. Thus, the element barriers will increase the reliability and prolong the expected service lifetime of the electrode.

Feeding elements of materials, such as for example graphite and mild steel, which in cathodic operation may be influenced by aliens ions from the environment, will have an increased service lifetime as the rate of such penetrations will be decreased with decreased current density.

With a more homogenous current density distribution along the active part of the surface of the electrode body, the whole surface area of the electrode body is efficiently used, which, as compared to hitherto known electrodes, for a given current to be transferred, results in smaller dimensions of the electrode and consequently reduced requirements on site areas and a less costly design, without exceeding a desired current density and electric field strength levels. Compared to a conventional HVDC land electrode, a HVDC land electrode according to the invention and transferring the same current, will have a substantially reduced size. Typically, a land electrode designed according to the invention, for a current of 1500 Å and located in soil with specific resistivity of 100 Ω*m, comprising three concentric rings, would have an diameter of the outer ring of about 250 m, as compared to a conventionally designed land electrode, the diameter of which would be in the order of 1000 m.

The sub-electrode barriers will homogenize the current distribution along the active part of the surface of the sub-electrode, that is the part of the backfill which is in electric contact with the surrounding soil. As a consequence, in anodic operation the rate of coke consumption will decrease, electro-osmotic soil drying will be decreased and the risk for drying out or overheating of the soil surrounding the electrode, with possible consequential harmful effects the environment, such as irreversible changes of soil properties, will be substantially reduced.

In homogeneous soil, the arrangement of the electrode contour lines as a circle of sub-electrodes, or in three concentric circles, results in a decreased size and a better utilization of the material in the electrode body.

At sites with inhomogeneous soil, electrode contour lines different from the circular form may be used, for example adapted in shape to a rectangular site or, to avoid particular parts of the site, given an irregular shape.

Tuning resistors connected in series with the section interconnection cables and/or the section feeder cables makes it possible to tune the current for each section or sub-section.

The soil border barriers make it possible to arrange the sub-electrodes in sections and sub-sections along non-closed electrode contour lines, for instance in the shape of circular arcs, to form individually and separately fed sub-sections and sections of vertically and/or horizontally oriented sub-electrodes.

The soil border barriers homogenize the current distribution along the respective sub-section and separate one soil layer from another, thereby making it possible to control the current within each sub-section of sub-electrodes in principle independent of the current in a neighboring sub-section.

The tuning resistors as well as the soil border barriers makes it possible to operate the electrode with a desired current distribution in dependence on the soil properties in which the respective sub-electrodes are embedded. This is feasible in particular as the current distribution within each sub-electrode is homogenized through the effect of the element barriers and of the sub-electrode barriers.

The element barriers can be applied also to land electrodes of the type described in connection with FIG. 14. Such electrodes usually penetrate soil layers with different properties, and the soil border barriers, horizontally oriented, can be applied at borders between such soil layers with the same effect as described above. For such electrodes, the element barriers can also provide mechanical protection to the electrode bodies and serve as connecting means.

The electrically non-conducting element barriers, sub-electrode barriers and soil border barriers as described above can alternatively be realized by having only those of their surfaces which are directed towards the active parts of the surfaces of the feeding elements, the active parts of the surfaces of the first backfill layer and towards the contour line along which the current distribution is to be homogenized, respectively, covered by a layer of such a non-conducting material, these layers there constituting said barriers.

What is claimed is:

1. Land electrode, having at least one feeding element to be embedded in a first conducting medium (170), characterized in that the feeding element is provided with at least two electrically non-conducting element barriers, spaced apart along the feeding element, and between which is formed an active part of the surface of the feeding element, said active part is in electric contact with the first conducting medium when the feeding element is embedded in it, said element barriers having a substantial extension outwards from said active part of the surface of the feeding element, so as to have a substantial extension into the first conducting medium when the feeding element is embedded in it, so as to homogenize the current distribution along said active part of the surface of the feeding element.

2. Land electrode according to claim 1, characterized in that said element barriers project from the surface of the feeding element at or close to border lines of said active part of the surface of the feeding element, in directions which, at that location, are substantially perpendicular to said active part of the surface of the feeding element.

3. Land electrode according to claim 1, wherein the feeding element is rod-shaped, characterized in that at least one of the element barriers has the shape of a plate, projecting from the surface of the feeding element in a direction substantially perpendicular to the longitudinal direction of the feeding element.

4. Land electrode according to claim 1, characterized in that at least one of said element barriers is arranged movable along the feeding element in its longitudial direction.

5. Land electrode according to claim 4, wherein the feeding element is to be arranged with its length axis substantially in a vertical direction, characterized in that the at least one of said element barriers which is arranged movable along the feeding element is provided with a top weight in such a way that said element barrier will exert a pressure on the portion of the first conducting medium that is located below said element barrier when the feeding element is embedded in the first conducting medium.

6. Land electrode according to claim 1, characterized in that it comprises a cylindrical metal tube which encloses the feeding element so as to form together with the at least two end barriers a closed canister, containing the feeding element and a backfill.

7. Land electrode according to claim 1, characterized in that at least one of said element barriers is made of material rendering it flexible.

8. Land electrode according to claim 1, wherein the first conducting medium is constituted by a first backfill layer, which is to be embedded in a second conducting medium, characterized in that the land electrode further comprises at least two electrically non-conducting sub-electrode barriers, spaced apart along the first backfill layer, and between which is formed an active part of the surface of the first backfill layer, said active part is in electric contact with the second conducting medium when the first backfill layer is embedded in it, said sub-electrode barriers having a substantial extension outwards from said active part of the surface of the first backfill layer, so as to have a substantial extension into the second conducting medium when the first backfill layer is embedded in it, so as to homogenize the current distribution along said active part of the surface of the first backfill layer.

9. Land electrode according to claim 8, characterized in that said sub-electrode barriers project from the surface of the first backfill layer at or close to border lines of said active part of the surface of the first backfill layer, in directions which, at that location, are substantially perpendicular to said active part of the surface of the first backfill layer.

10. Land electrode according to claim 8, characterized in that at least one of the sub-electrode barriers has the shape of a plate, projecting from the surface of the first backfill layer in a direction substantially perpendicular to the longitudinal direction of the feeding element.

11. Land electrode according to claim 1, wherein the first conducting medium is constituted by a first backfill layer, characterized in that the land electrode further comprises at least two electrically non-conducting sub-electrode barriers, spaced apart along the first backfill layer, and between which is formed an active part of the surface of the first backfill layer, and a second conducting backfill layer of a material having a low electro-osmotic rate, such as for example sand, said second backfill layer being located between said sub-electrode barriers so as to embed the first backfill layer and being in electric contact with said active part of the surface of the first backfill layer and with a conducting medium in which said second backfill layer is to be embedded, said sub-electrode barriers having a substantial extension outwards from said active part of the surface of the first backfill layer in the direction of said second backfill layer, so as to homogenize the current distribution along said active part of the surface of the first backfill layer, and in the purpose to avoid creation of zones of soil drying up in said conducting medium.

12. Land electrode according to claim 1, wherein the first conducting medium is constituted by a first backfill layer, which is to be embedded in a second conducting medium, characterized in that the land electrode further comprises at least two electrically non-conducting sub-electrode barriers, spaced apart along the first backfill layer, and between which is formed an active part of the surface of the first backfill layer, said active part is in electric contact with the second conducting medium (28) when the first backfill layer is embedded in it, said sub-electrode barriers having substantially the same cross-section dimension as the cross-section dimension of the first backfill layer, in the purpose to homogenize the current distribution along said active part of the surface of the first backfill layer.

13. Land electrode according to claim 8, wherein the feeding element with its length axis substantially in a vertical direction, characterized in that at least one of said sub-electrode barriers is provided with a top weight in such a way that said sub-electrode barrier will exert a pressure on the portion of the first conducting medium that is located below said element barrier.

14. Land electrode, having at least one feeding element to be embedded in a first backfill layer, characterized in that the land electrode further comprises at least two electrically non-conducting sub-electrode barriers, spaced apart along the first backfill layer, and between which is formed an active part of the surface of the first backfill layer, and a second conducting backfill layer, said second backfill layer being located between said sub-electrode barriers so as to embed the first backfill layer and being in electric contact with said active part of the surface of the first backfill layer and with a conducting medium, in which said second backfill layer is to be embedded, said sub-electrode barriers having a substantial extension outwards from said active part of the surface of the first backfill layer in the direction of said second backfill layer, so as to homogenize the current distribution along said active part of the surface of the first backfill layer, and in that the feeding element is provided with at least one electrically non-conducting element barrier, and an active part of the surface of the feeding element is formed between said element barrier and one of said sub-electrode barriers ((82*b*), said active part is in electric contact with the first conducting medium when the feeding element is embedded in it, said element barrier having a substantial extension outwards from said active part of the surface of the feeding element, so as to have a substantial extension into the first conducting medium when the feeding element is embedded in it, so as to homogenize, together with the one of said sub-electrode barriers, the current distribution along said active part of the surface of the feeding element.

15. Land electrode according to claim 1, having a plurality of sub-electrodes, each of which comprising at least one feeding element, characterized in that the sub-electrodes are arranged in at least two sub-sections, each of which being coupled via a separate section interconnection cable to a common section feeder cable, and in that a resistor with influenceable resistance is connected in series with at least one of said section interconnection cables, between said common section feeder cable and said section interconnection cable, so as to influence the current distribution between said at least to sub-sections.

16. Land electrode according to claim 1, having a plurality of sub-electrodes, each of which comprising at least one feeding element, wherein a contour line of the sub-electrodes passes through a soil layer with soil properties, such as electrical, thermal or hydrological parameters, which differ from the soil properties of its adjacent soil layers, characterized in that the land electrode further comprises at least two non-conducting soil border barriers, each of which located at said contour line at or close to a location where the soil layer borders on one of said adjacent soil layers, so as to homogenize the current distribution along the contour line and to separate the soil layer from said adjacent soil layers.

17. Land electrode according to claim 1, having a plurality of sub-electrodes, each comprising at least one feeding element, characterized in that the sub-electrodes are arranged in at least three sub-sections, that each sub-section has a contour line substantially in the shape of a circular arc and with a radius such that the contour lines of all the sub-sections of the electrode substantially coincide with three concentric circles.

18. Use of a land electrode according to claim 1, wherein said at least one feeding element is coupled to an electrode line of a high voltage direct current (HVDC) transmission system, for service as a ground electrode in said HVDC transmission system.

* * * * *